United States Patent [19]

Makakura

[11] Patent Number: 5,198,993
[45] Date of Patent: Mar. 30, 1993

[54] ARITHMETIC DEVICE HAVING A PLURALITY OF PARTITIONED ADDERS

[75] Inventor: Yasuhiro Makakura, Toyonaka, Japan

[73] Assignee: Matsushita Electric Industrial Co., Ltd., Osaka, Japan

[21] Appl. No.: 619,635

[22] Filed: Nov. 28, 1990

[30] Foreign Application Priority Data

Dec. 4, 1989 [JP] Japan ................... 1-314758

[51] Int. Cl.$^5$ .......................... G06F 7/50; G06F 7/38
[52] U.S. Cl. ........................... 364/788; 364/745
[58] Field of Search ............. 364/788, 770, 741, 745, 364/748, 740, 784, 785, 786, 787

[56] References Cited

U.S. PATENT DOCUMENTS

| | | | |
|---|---|---|---|
| 3,553,446 | 1/1971 | Kruy | 364/788 |
| 3,842,250 | 10/1974 | Anderson | 364/745 X |
| 4,682,303 | 7/1987 | Uya | 364/788 |
| 5,027,310 | 6/1991 | Dalrymple | 364/770 |
| 5,047,976 | 9/1991 | Goto et al. | 364/788 |

*Primary Examiner*—Jerry Smith
*Assistant Examiner*—Chuong Ngo
*Attorney, Agent, or Firm*—Lowe, Price, LeBlanc & Becker

[57] ABSTRACT

Input data are separated into a plurality of partitioned input data. A plurality of partitioned incrementers receive a plurality of partitioned input data respectively, and each include an adder adding "1" to partitioned input data, and a data selector selecting one of the partitioned data and output data from the adder in response to a selection signal. An n-th group is defined by a $(2n-1)$-th partitioned incrementer and a 2n-th partitioned incrementer, where "n" denotes natural numbers between 1 and a given number equal to a total number of groups. The n-th group includes the $(2n-1)$-th partitioned incrementer, the 2n-th partitioned incrementer, a group carry generating circuit, and a selection signal generating circuit, wherein the group carry generating circuit generates a group carry output of the n-th group on the basis of a carry output from an adder in the $(2n-1)$-th partitioned incrementer, a carry output from an adder in the 2n-th partitioned incrementer, and a carry input from an $(n-1)$-th group, and wherein the selection signal generating circuit generates a selection signal to a data selector in the 2n-th partitioned incrementer on the basis of the carry output from the adder in the $(2n-1)$-th partitioned incrementer and the carry input from the $(n-1)$-th group.

5 Claims, 15 Drawing Sheets

ARITHMETIC DEVICE HAVING A PLURALITY OF PARTITIONED ADDERS

BACKGROUND OF THE INVENTION

This invention relates to an arithmetic device such as an incrementer, a rounding circuit, an adding device, a subtracting device, or a 2-input adding device.

As will be explained later, a prior art adding device and a prior art rounding circuit have some problems.

SUMMARY OF THE INVENTION

It is an object of this invention to provide an improved arithmetic device.

A first aspect of this invention provides an arithmetic device for executing an arithmetic operation on input data separated into a plurality of partitioned input data, the device comprising a plurality of partitioned incrementers receiving a plurality of partitioned input data respectively and each including an adder adding "1" to partitioned input data, and a data selector selecting one of the partitioned data and output data from the adder in response to a selection signal; an n-th group defined by a (2n−1)-th partitioned incrementer and a 2-th partitioned incrementer, where "n" denotes natural numbers between 1 and a given number equal to a total number of groups; the n-th group including the (2n−1)-th partitioned incrementer, the 2n-th partitioned incrementer, a group carry generating circuit, and a selection signal generating circuit, wherein the group carry generating circuit generates a group carry output of the n-th group on the basis of a carry output from an adder in the (2n−1)-th partitioned incrementer, a carry output from an adder in the 2n-th partitioned incrementer, and a carry input from an (n−1)-th group, and wherein the selection signal generating circuit generates a selection signal to a data selector in the 2n-th partitioned incrementer on the basis of the carry output from the adder in the (2n−1)-th partitioned incrementer and the carry input from the (n−1)-th group; wherein a group carry output from the (n−1)-th group constitutes a selection signal to a data selector in the (2n−1)-th partitioned incrementer, wherein bit lengths of the (2n−1)-th partitioned incrementer and the 2n-th partitioned incrementer are chosen so that a propagation gate stage number of a group carry output of the (n−1)-th group which is inputted in the group carry generating circuit of the n-th group will be equal to a propagation gate stage number of the carry outputs from the adders in the (2n−1)-th partitioned incrementer and the 2-th partitioned incrementer, and wherein partitioned sums outputted from data selectors in the respective groups compose a sum result output.

A second aspect of this invention provides an arithmetic device for executing an arithmetic operation on input data separated into a plurality of partitioned input data, the device comprising a plurality of partitioned adders receiving a plurality of partitioned input data respectively and each including a first adder element adding "1" to partitioned input data, an inverter inverting the partitioned input data, a second adder element adding "1" to output data from the inverter, and a data selector selecting one of the partitioned data, the output data from the inverter, output data from the first adder element, and output data from the second adder element in response to a selection signal; an n-th group defined by a (2n−1)-th partitioned adder and a 2n-th partitioned adder, where "n" denotes natural numbers between 1 and a given number equal to a total number of groups; the n-th groups including the (2n−1)-th partitioned adder, the 2n-th partitioned adder, a positive group carry generating circuit, a negative group carry generating circuit, a first selection signal generating circuit, and a second selection signal generating circuit, wherein the positive group carry generating circuit generates a positive group carry output of the n-th group on the basis of a carry output from a first adder element in the (2n−1)-th partitioned adder, a carry output from a first adder element in the 2n-th partitioned adder, and a positive carry output from an (n−1)-th group, wherein the negative group carry generating circuit generates a negative group carry output of the n-th group on the basis of a carry output from a second adder element in the (2n−1)-th partitioned adder, a carry output from a second adder element in the 2n-th partitioned adder, and a negative carry output from the (n−1)-th group, wherein the first selection signal generating circuit generates a selection signal to a data selector in the (2n−1)-th partitioned adder on the basis of the positive carry output from the (n−1)-th group, the negative carry output from the (n−1)-th group, and a sign signal, and wherein the second selection signal generating circuit generates a selection signal to a data selector in the 2n-th partitioned adder on the basis of the positive carry output from the (n−1)-th group, the negative carry output from the (n−1)-th group, the sign signal, the carry output from the first adder element in the (2n−1)-th partitioned adder, and the carry output from the second adder element in the (2n−1)-th partitioned adder; wherein bit lengths of the first and second adder elements in the (2n−1)-th partitioned adder and the 2n-th partitioned adder are chosen so that propagation gate stage numbers of positive and negative group carry outputs of the (n−1)-th group which are inputted into the positive and negative group carry generating circuits of the n-th group will be equal to propagation gate stage numbers of the carry outputs from the first and second adder elements in the (2n−1)-th partitioned adder and the 2n-th partitioned adder, and wherein partitioned sums outputted from data selectors in the respective groups compose a sum result output.

A third aspect of this invention provides an arithmetic device for executing an arithmetic operation on input data separated into a plurality of partitioned input data, the device comprising a plurality of partitioned adders receiving a plurality of partitioned input data respectively and each including a first adder element adding "1" to partitioned input data, an inverter inverting the partitioned input data, a second adder element adding "1" to output data from the inverter, a data selector selecting one of the partitioned data, the output data from the inverter, output data from the first adder element, and output data from the second adder element in response to a selection signal, and a carry selector selecting one of carry outputs from the first and second adder elements; an n-th group defined by a (2n−1)-th partitioned adder and a 2n-th partitioned adder, where "n" denotes natural numbers between 1 and a given number equal to a total number of groups; the n-th group including the (2n−1)-th partitioned adder, the 2n-th partitioned adder, a group carry generating circuit, a first selection signal generating circuit, and a second selection signal generating circuit, wherein the group carry generating circuit generates a group carry output of the n-th group on the basis of carry outputs from carry selectors in the (2n−1)-th partitioned adder and the 2n-th partitioned adder and a group carry output from an (n−1)-th group, wherein the first selection signal generating circuit generates a selection signal to a data selector in the (2n−1)-th partitioned adder on the basis of the group carry output from the (n−1)-th group and a sign signal, and wherein the second selection signal generating circuit generates a selection signal to a data selector in the 2n-th partitioned adder on the basis of the group carry output from the (n−1)-th group, the sign signal, and the carry output from the carry selector in the (2n−1)-th partitioned adder; wherein bit lengths of the (2n−1)-th partitioned adder and the 2n-th partitioned adder are chosen so that a propagation gate stage number of the group carry output of the (n−1)-th group which is inputted into the group carry generating circuit in the n-th group will be equal to propagation gate stage numbers of the carry outputs from the carry selectors in the (2n−1)-th partitioned adder and the 2n-th partitioned adder, and wherein partitioned sums outputted from data selectors in the respective groups compose a sum result output.

A fourth aspect of this invention provides an arithmetic device for executing an arithmetic operation between input addend data and input augend data separated into a plurality of partitioned input addend data and a plurality of partitioned input augend data, the device comprising a plurality of partitioned adders receiving a plurality of partitioned input addend data and a plurality of partitioned input augend data respectively and each including a first adder element adding partitioned input addend data and partitioned input augend data with a carry input being "0", a second adder element adding the partitioned input addend data and the partitioned input augend data with a carry input being "1", and a data selector selecting one of output data from the first adder element and output data from the second adder element in response to a selection signal; an n-th group defined by a (2n−1)-th partitioned adder and a 2n-th partitioned adder, where "n" denotes natural numbers between 1 and a given number equal to a total number of groups; the n-th group including the (2n−1)-th partitioned adder, the 2n-th partitioned adder, a group carry generating circuit, and a selection signal generating circuit wherein the group carry generating circuit generates a group carry output of the n-th group on the basis of carry outputs from first and second adder elements in the (2n−1)-th partitioned adder and the 2n-th partitioned adder and a group carry output from an (n−1)-th group, and wherein the selection signal generating circuit generates a selection signal to a data selector in the 2n-th partitioned adder on the basis of the carry outputs from the first and second adder elements in the (2n−1)-th partitioned adder and the group carry output from the (n−1)-th group; wherein the group carry output of the (n−1)-th group constitutes a selection signal to a data selector in the (2n−1)-th partitioned adder, wherein bit lengths of the (2n−1)-th partitioned adder and the 2n-th partitioned adder are chosen so that propagation gate stage numbers of the carry outputs of the first and second adder elements in the (2n−1)-th partitioned adder and the 2n-th partitioned adder will be equal to a propagation gate stage number of the group carry output which is measured from data input, and wherein partitioned sums outputted from data selectors in the respective groups compose a sum result output.

A fifth aspect of this invention provides an arithmetic device for executing an arithmetic operation between input addend data and input augend data separated into a plurality of partitioned input addend data and a plurality of partitioned input augend data, the device comprising a plurality of partitioned adders receiving a plurality of partitioned input addend data and a plurality of partitioned input augend data respectively and each y including a first adder element adding partitioned input addend data and partitioned input augend data with a carry input being "0", a second adder element adding the partitioned input addend data and the partitioned input augend data with a carry input being "1", an inverter inverting the partitioned input augend data, a third adder element adding the partitioned input addend data and output data from the inverter with a carry input being "0", a fourth adder element adding the partitioned input addend data and output data from the inverter with a carry input being "1", a first partitioned carry generating circuit, a second partitioned carry generating circuit, and a data selector, wherein the first partitioned carry generating circuit generates a first carry output on the basis of a carry output from the first adder element, a carry output from the second adder element, and a first partitioned carry input, wherein the second partitioned carry generating circuit generates a second partitioned carry output on the basis of a carry output from the third adder element, a carry output from the fourth adder element, and a second partitioned carry input, and wherein the data selector selects one of output data from the first adder element, the second adder element, the third adder element, and the fourth adder element in response to the first partitioned carry input, the second partitioned carry input, and a sign signal; wherein partitioned sums outputted from data selectors in the respective partitioned adders compose a sum result output.

DESCRIPTION OF THE PRIOR ART

Figure 1:
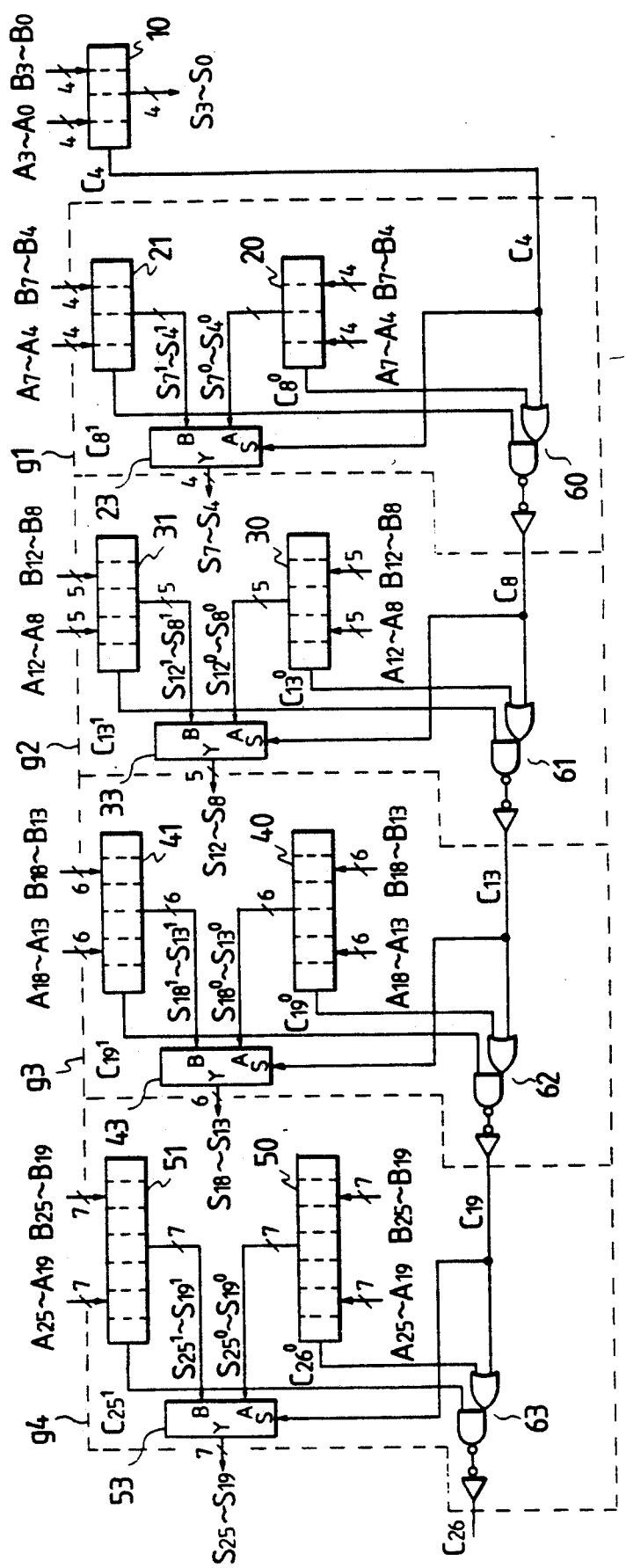
FIG. 1 is a block diagram of a prior art adding device.

FIG. 1 shows a prior art adding device which includes adders 10, 20, 30, 40, and 50 with carry inputs of "0", and adders 21, 31, 41, and 51 with carry inputs of "1". The prior art adding device also includes selectors 23, 33, 43, and 53, and carry generating circuits 60, 61, 62, and 63.

The selector 23 selects output data from the adders 20 and 21. The adders 20 and 21, the selector 23, and the carry generating circuit 60 compose a partitioned adder g1. Partitioned adders g2, g3, and g4 are similarly provided.

Partitioned input data are added by the partitioned adders g1-g4 respectively with respect to carries of "0" and "1". The addition result data are selected by the selectors 23-53, forming a solution output. A carry is propagated through each of the partitioned adders g1-g4, and the selectors 23-53 are controlled by the partitioned carry outputs.

The prior art adding device of FIG. 1 has the following problem. Since a carry is propagated through each of the partitioned adders g1-g4, the calculation time spent in the total addition tends to be long.

Figure 2:
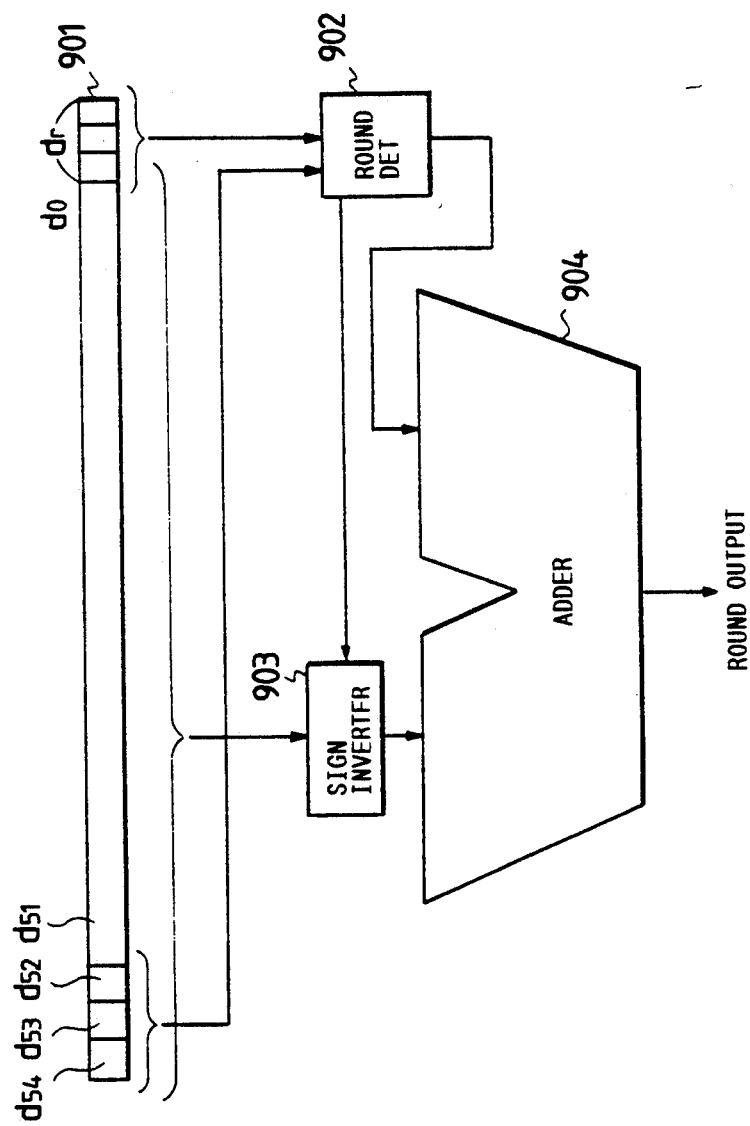
FIG. 2 is a block diagram of a prior art rounding circuit.

FIG. 2 shows a prior art rounding circuit which includes a rounding place detecting circuit (a carry detecting circuit), a sign inverting circuit 903, and an adder 904. With respect to the addition and subtraction between 64-bit floating-point data, the following first and second cases have different rounding bit places, the first case being that the result of the addition of 52 bits of the mantissa parts is expressed as "01*.*****", the second case being that the result of the addition of 52 bits of the mantissa parts is expressed as "001.***" or "000.***". In the case where the sign bit is "1", that is, in the case where the result of the addition of 52 bits of the mantissa parts is expressed as "1.*******", it is necessary to invert the input data from negative to positive and to add "1" to the lowest bit (LSB) of the input data.

Accordingly, in the prior art rounding circuit of FIG. 2, the sign bit d54, the carry bit d53, the borrow bit d52, and the round bits dr of input data 901 are inputted into the rounding place detecting circuit 902 so that the rounding bit place can be detected. When the input data 901 are detected as being negative, the input data 901 are inverted by the sign inverting circuit 903 and the outputs from the sign inverting circuit 903 and the rounding place detecting circuit 902 are added by the adder 904 to form a rounded output.

The prior art rounding circuit of FIG. 2 has the following problem. Since the data are operated by the adder 904 after the data are inputted and are then passed through the rounding place detecting circuit 902 and the sign inverting circuit 903, the calculation time spent in the rounding tends to be long.

DESCRIPTION OF THE FIRST PREFERRED EMBODIMENT

Figure 3:
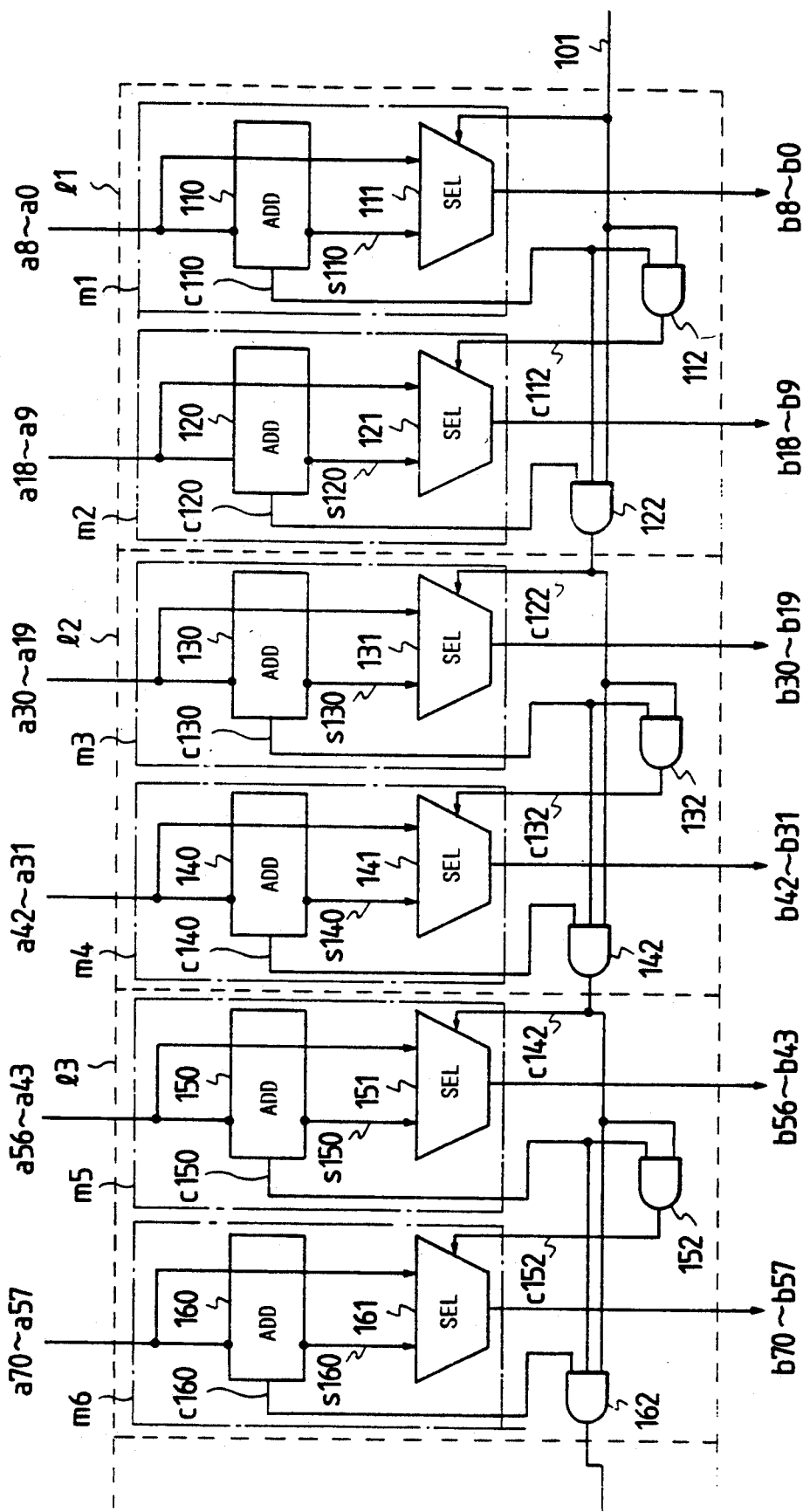
FIG. 3 is a block diagram of an incrementer according to a first embodiment of this invention.

FIG. 3 shows an incrementer according to a first embodiment of this invention. Input data into the incrementer are separated into six partitioned data a0-a8, a9-a18, a19-a30, a31-a42, a43-a56, and a57-a70. Similarly, output data from the incrementer are divided into six partitioned data b0-b8, b9-b18, b19-b30, b31-b42, b43-b56, and b57-b70.

The incrementer includes adders 110, 120, 130, 140, 150, and 160, data selectors 111, 121, 131, 141, 151, and 161, selection signal generating circuits 112, 132, and 152, and group carry generating circuits 122, 142, and 162. The adders 110, 120, 130, 140, 150, and 160 serve to add "1" to the partitioned input data respectively.

The adder 110 and the data selector 111 are connected to compose a partitioned incrementer m1. The adder 120 and the data selector 121 are connected to compose a partitioned incrementer m2. The adder 130 and the data selector 131 are connected to compose a partitioned incrementer m3. The adder 140 and the data selector 141 are connected to compose a partitioned incrementer m4. The adder 150 and the data selector 151 are connected to compose a partitioned incrementer m5. The adder 160 and the data selector 161 are connected to compose a partitioned incrementer m6. The partitioned incrementers m1, m2, m3, m4, m5, and m6 are fed with the partitioned input data a0-a8, a9-a18, a19-a30, a31-a42, a43-a56, and a57-a70 respectively, and output the partitioned output data b0-b8, b9-b18, b19-b30, b31-b42, b43-b56, and b57-b70 respectively.

The incrementers m1 and m2, the selection signal generating circuit 112, and the group carry generating circuit 122 are connected to compose a group incrementer l1. The incrementers m3 and m4, the selection signal generating circuit 132, and the group carry generating circuit 142 are connected to compose a group incrementer l2. The incrementers m5 and m6, the selection signal generating circuit 152, and the group carry generating circuit 162 are connected to compose a group incrementer l3.

The bit lengths of the partitioned incrementers m1 and m2 are equal. The bit lengths of the partitioned incrementers m3 and m4 are equal. The bit lengths of the partitioned incrementers m5 and m6 are equal. The bit length of the partitioned incrementers m3 and m4 are chosen so that the sum of the number of the stages of gates through which a carry output from the partitioned incrementer m1 propagates and the number of the stages of gates in the group carry generating circuit 122 will be equal to the number of the stages of gates through which a carry output from the partitioned incrementer m3 propagates. The bit number of the partitioned incrementer m3 is set greater than the of the partitioned incrementer m1.

The partitioned input data a0-a8, a9-a18, a19-a30, a31-a42, a43-a56, and a57-a70 are fed to the adders 110, 120, 130, 140, 150, and 160 respectively, and "1" is added to the partitioned input data by the adders. The adders 110, 120, 130, 140, 150, and 160 output data s110, s120, s130, s140, s150, and s160 which are equal to the results of the addition between "1" and the partitioned input data respectively.

In addition, the partitioned input data a0-a8, a9-a18, a19-a30, a31-a42, a43-a56, and a57-a70 are fed to the data selectors 111, 121, 131, 141, 151, and 161 respectively. The data selectors 111, 121, 131, 141, 151, and 161 also receive the addition result data s110, s120, s130, s140, s150, and s160 from the adders 110, 120, 130, 140, 150, and 160 respectively. One of the partitioned input data a0–a8 and the addition result data s110 are selected by the data selector 111 in response to a fed data selection signal. One of the partitioned input data a9–a18 and the addition result data s120 are selected by the data selector 121 in response to a fed data selection signal. One of the partitioned input data a19–a30 and the addition result data s130 are selected by the data selector 131 in n response to a fed data selection signal. One of the partitioned input data a31–a42 and the addition result data s140 are selected by the data selector 141 in response to a fed data selection signal. One of the partitioned input data a43–a56 and the addition result data s150 are selected by the data selector 151 in response to a fed data selection signal. One of the partitioned input data a57–a70 and the addition result data s160 are selected by the data selector 161 in response to a fed data selection signal.

A carry input 101 is used as the data selection signal fed to the data selector 111. An output c112 from the selection signal generating circuit 112 is used as the data selection signal fed to the data selector 121. The selection signal generating circuit 112 includes an AND gate which generates the signal c112 on the basis of the carry input 101 and a carry output c110 from the adder 110. An output c122 from the group carry generating circuit 122 is used as the data selection signal fed to the data selector 131. The group carry generating circuit 122 includes an AND gate which generates the signal c122 on the basis of the carry input 101, the carry output c110 from the adder 110, and a carry output c120 from the adder 120. The output c122 from the group carry generating circuit 122 is a carry output from the group incrementer 11. An output c132 from the selection signal generating circuit 132 is used as the data selection signal fed to the data selector 141. The selection signal generating circuit 132 includes an AND gate which generates the signal c132 on the basis of the signal c122 and a carry output c130 from the adder 130. An output c142 from the group carry generating circuit 142 is used as the data selection signal fed to the data selector 151. The group carry generating circuit 142 includes an AND gate which generates the signal c142 on the basis of the signal c122, the carry output c130 from the adder 130, and a carry output c140 from the adder 140. The output c142 from the group carry generating circuit 142 is a carry output from the group incrementer 12. An output c152 from the selection signal generating circuit 152 is used as the data selection signal fed to the data selector 161. The selection signal generating circuit 152 includes an AND gate which generates the signal c152 on the basis of the signal c142 and a carry output c150 from the adder 150. The group carry generating circuit 162 includes an AND gate which generates a group carry signal on the basis of the signal c142, the carry output c150 from the adder 150, and a carry output c160 from the adder 160. The output from the group carry generating circuit 162 is a carry output from the group incrementer 13.

Figure 4:
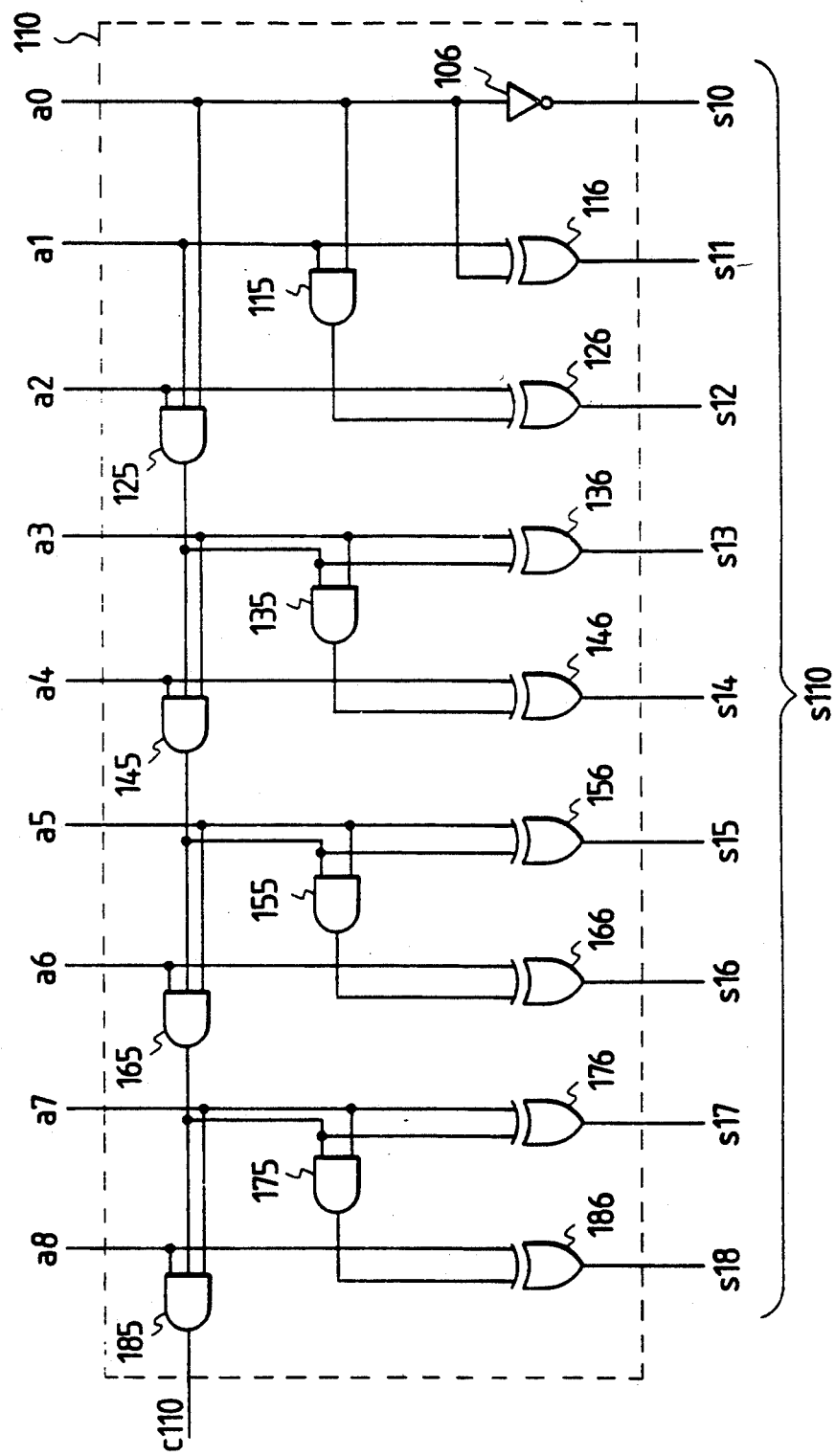
FIG. 4 is a block diagram of an adder in the incrementer of FIG. 3.

The adders 110, 120, 130, 140, 150, and 160 have similar internal designs so that only the adder 110 will be described in detail. As shown in FIG. 4, the adder 110 includes an inverter 106, AND circuits 115, 125, 135, 145, 155, 165, 175, and 185, and Exclusive-OR circuits 116, 126, 136, 146, 156, 166, 176, and 186.

The bits a0, a1, and a2 of the input data are fed to the AND circuit 125. The AND circuit 125 generates a carry output for the bit a3 on the basis of the bits a0, a1, and a2 of the input data. The carry output from the AND circuit 125, and the bits a3 and a4 of the input data are fed to the AND circuit 145. The AND circuit 145 generates a carry output for the bit a5 on the basis of the carry output from the AND circuit 125, and the bits a3 and a4 of the input data. The carry output from the AND circuit 145, and the bits a5 and a6 of the input data are fed to the AND circuit 165. The AND circuit 165 generates a carry output for the bit a7 on the basis of the carry output from the AND circuit 145, and the bits a5 and a6 of the input data. The carry output from the AND circuit 165, and the bits a7 and a8 of the input data are fed to the AND circuit 185. The AND circuit 185 generates the carry output c110 of the adder 110 on the basis of the carry output from the AND circuit 165, and the bits a7 and a8 of the input data.

The bits a0 and a1 of the input data are fed to the AND circuit 115. The AND circuit 115 generates a carry output for the bit a2 on the basis of the bits a0 and a1 of the input data. The output from the AND circuit 125 and the bit a3 of the input data are fed to the AND circuit 135. The AND circuit 135 generates a carry output for the bit a4 on the basis of the output from the AND circuit 125 and the bit a3 of the input data. The output from the AND circuit 145 and the bit a5 of the input data are fed to the AND circuit 155. The AND circuit 155 generates a carry output for the bit a6 on the basis of the output from the AND circuit 145 and the bit a5 of the input data. The output from the AND circuit 165 and the bit a7 of the input data are fed to the AND circuit 175. The AND circuit 175 generates a carry output for the bit a8 on the basis of the output from the AND circuit 165 and the bit a7 of the input data.

The bit a0 of the input data is fed to the inverter 106. The inverter 106 inverts the bit a0 of the input data into a solution output bit s10. The bits a0 and a1 of the input data are fed to the Exclusive-OR circuit 116. The Exclusive-OR circuit 116 generates a solution output bit s11 on the basis of the bits a0 and a1 of the input data. The carry output from the AND circuit 115 and the bit a2 of the input data are fed to the Exclusive-OR circuit 126. The Exclusive-OR circuit 126 generates a solution output bit s12 on the basis of the carry output from the AND circuit 115 and the bit a2 of the input data. The carry output from the AND circuit 125 and the bit a3 of the input data are fed to the Exclusive-OR circuit 136. The Exclusive-OR circuit 136 generates a solution output bit s13 on the basis of the carry output from the AND circuit 125 and the bit a3 of the input data. The carry output from the AND circuit 135 and the bit a4 of the input data are fed to the Exclusive-OR circuit 146. The Exclusive-OR circuit 146 generates a solution output bit s14 on the basis of the carry output from the AND circuit 135 and the bit a4 of the input data. The carry output from the AND circuit 145 and the bit a5 of the input data are fed to the Exclusive-OR circuit 156. The Exclusive-OR circuit 156 generates a solution output bit s15 on the basis of the carry output from the AND circuit 145 and the bit a5 of the input data. The carry output from the AND circuit 155 and the bit a6 of the input data are fed to the Exclusive-OR circuit 166. The Exclusive-OR circuit 166 generates a solution output bit s16 on the basis of the carry output from the AND circuit 155 and the bit a6 of the input data. The carry output from the AND circuit 165 and the bit a7 of the input data are fed to the Exclusive-OR circuit 176. The Exclusive-OR circuit 176 generates a solution output bit s17 on the basis of the carry output from the AND circuit 165 and the bit a7 of the input data. The carry output from the AND circuit 175 and the bit a8 of the input data are fed to the Exclusive-OR circuit 186. The Exclusive-OR circuit 186 generates a solution output bit s18 on the basis of the carry output from the AND circuit 175 and the bit a8 of the input data. The solution output bits s10–s18 compose the solution output s110.

The calculation time spent by the incrementer of FIG. 3 will be expressed in the number of stages of gates where an AND circuit is regarded as two gates. The first period which ends at the generation of the carry output from the adder 110 corresponds to a gate stage number of 8. During the first period, the carry from the partitioned incrementer m2 is generated. The second period which ends at the generation of the group carry output c122 corresponds to a gate stage number of 2 formed by the group carry generating circuit 122. Until the end of the second period, the carries from the partitioned incrementers m3 and m4 are generated. The third period which ends at the generation of the selection signal c152 corresponds to a gate stage number of 4 formed by the group carry generating circuit 142 and the selection signal generating circuit 152. Therefore, the total calculation time of the incrementer is expressed as corresponding to a gate stage number of 14. A prior art incrementer having the same bit number as the incrementer of FIG. 3 corresponds to a gate stage number of 26. Accordingly, the calculation time of the incrementer of FIG. 3 can be shorter than the calculation time of the prior art incrementer.

Since there are many similar sections in the incrementer of FIG. 3, the layout of the incrementer can be easy.

DESCRIPTION OF THE SECOND PREFERRED EMBODIMENT

Figure 5:
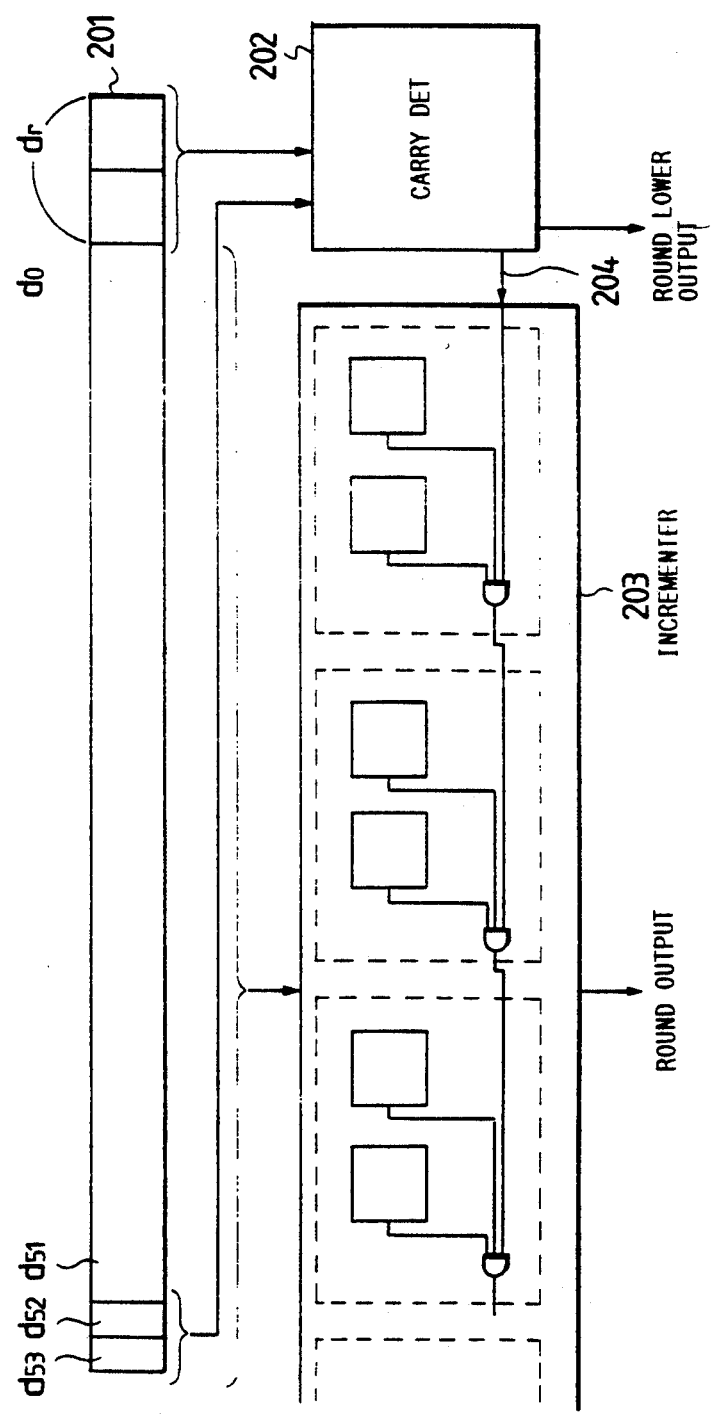
FIG. 5 is a block diagram of a rounding circuit according to a second embodiment of this invention.

FIG. 5 shows a rounding circuit according to a second embodiment of this invention. In FIG. 5, input data 201 include carry bits d53 and d52 and round data bits dr. The rounding circuit includes a carry detecting circuit (a round place detecting circuit) 202 and an incrementer 203. The incrementer 203 can be the incrementer of FIG. 3.

The carry bits d53 and d52 and the round data bits dr of the input data 201 are fed to the carry detecting circuit 202. A carry output 204 from the carry detecting circuit 202 is fed to the incrementer 203 as a first-stage group carry input. The bit lengths of the first-stage partitioned incrementer and the second-stage partitioned incrementer within the incrementer 203 are chosen so that the output propagation gate stage number of the carry detecting circuit 202 will be equal to the gate delay stage numbers of the carry outputs from the first-stage partitioned incrementer and the second-stage partitioned incrementer within the incrementer 203. The output signal from the incrementer 203 is used as a round output.

Figure 6:
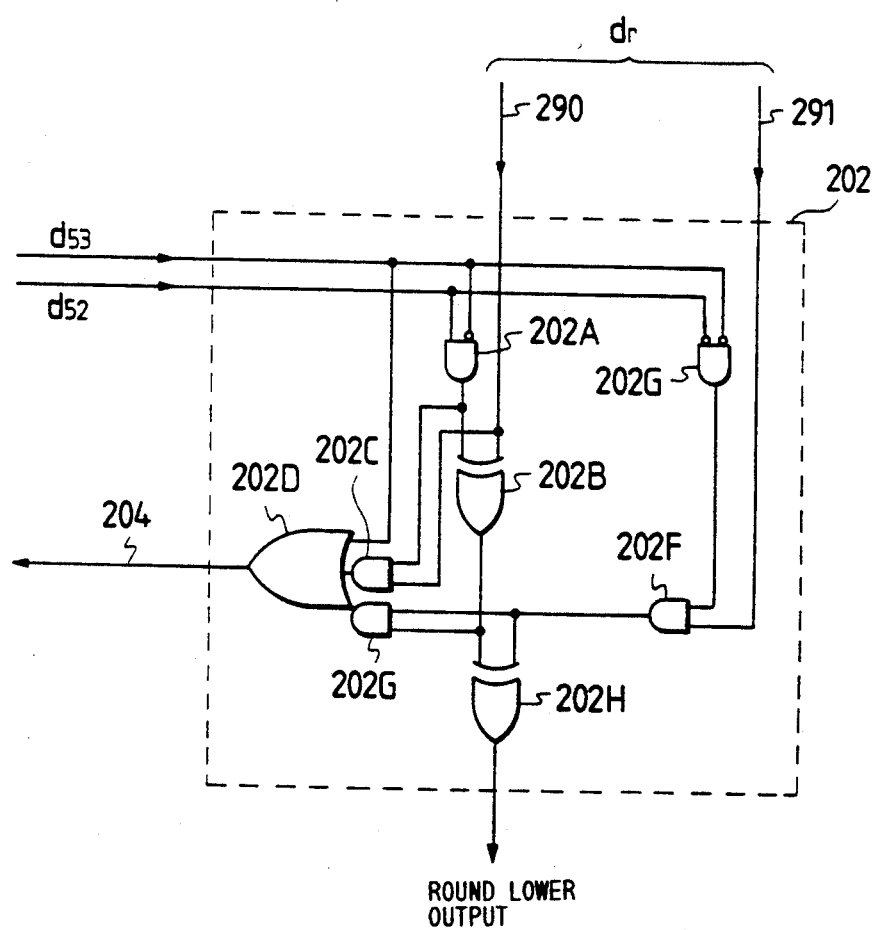
FIG. 6 is a block diagram of the carry detecting circuit of FIG. 5.

As shown in FIG. 6, the carry detecting circuit 202 includes gates (logic operation elements) 202A–202H. The carry bits d53 and d52 of the input data are fed to input terminals of the gate 202A respectively. The output signal from the gate 202A is fed to a first input terminal of the gate 202B. A round data bit 290 of the input data is fed to a second input terminal of the gate 202B. The output signal from the gate 202A is fed to a first input terminal of the gate 202C. The round data bit 290 of the input data is fed to a second input terminal of the gate 202C. A first input terminal of the gate 202D receives the carry bit d53 of the input data. A second input terminal of the gate 202D receives the output signal from the gate 202C. The carry bits d53 and d52 of the input data are fed to input terminals of the gate 202E respectively. The output signal from the gate 202E is fed to a first input terminal of the gate 202F. A round data bit 291 of the input data is fed to a second input terminal of the gate 202F. The output signal from the gate 202F is fed to a first input terminal of the gate 202G. A second input terminal of the gate 202G receives the output signal from the gate 202B. The output signal from the gate 202G is fed to a third input terminal of the gate 202D. The gate 202D generates the carry output 204. A first input terminal of the gate 202H receives the output signal from the gate 202B. A second input terminal of the gate 202H receives the output signal from the gate 202F. The gate 202H generates a lower rounded output. The round data bits 290 and 291 form the round data bits dr.

The internal design of the carry detection circuit 202 is suited to the following round mode. With respect to the addition between data having 52-bit mantissa parts: "1" is added to the LSB of the significant bits in the case where the addition result output is "1*.*•••"; "1" is added to the guard bit which is lower in place than the LSB by one bit in the case where the addition result output is "01.*•••"; and "1" is added to the round bit which is lower in place than the LSB by two bits in the case where the addition result output is "00.•••".

The carry detection circuit 202 may be modified as follows. In a first modification, the round data bits dr are composed of the LSB, the guard bit, and the round bit. In a second modification, the sticky bit which is lower in place than the LSB by three bits is used in the round data bits dr.

A part of the calculation of the incrementer 203 is executed during the time of the detection of the rounding place and therefore the total calculation time of the rounding circuit of FIG. 5 can be short, while the total rounding calculation time is equal to the sum of the time of the detection of the rounding place and the calculation time of the adder in the prior art rounding circuit of FIG. 2.

DESCRIPTION OF THE THIRD PREFERRED EMBODIMENT

Figure 7:
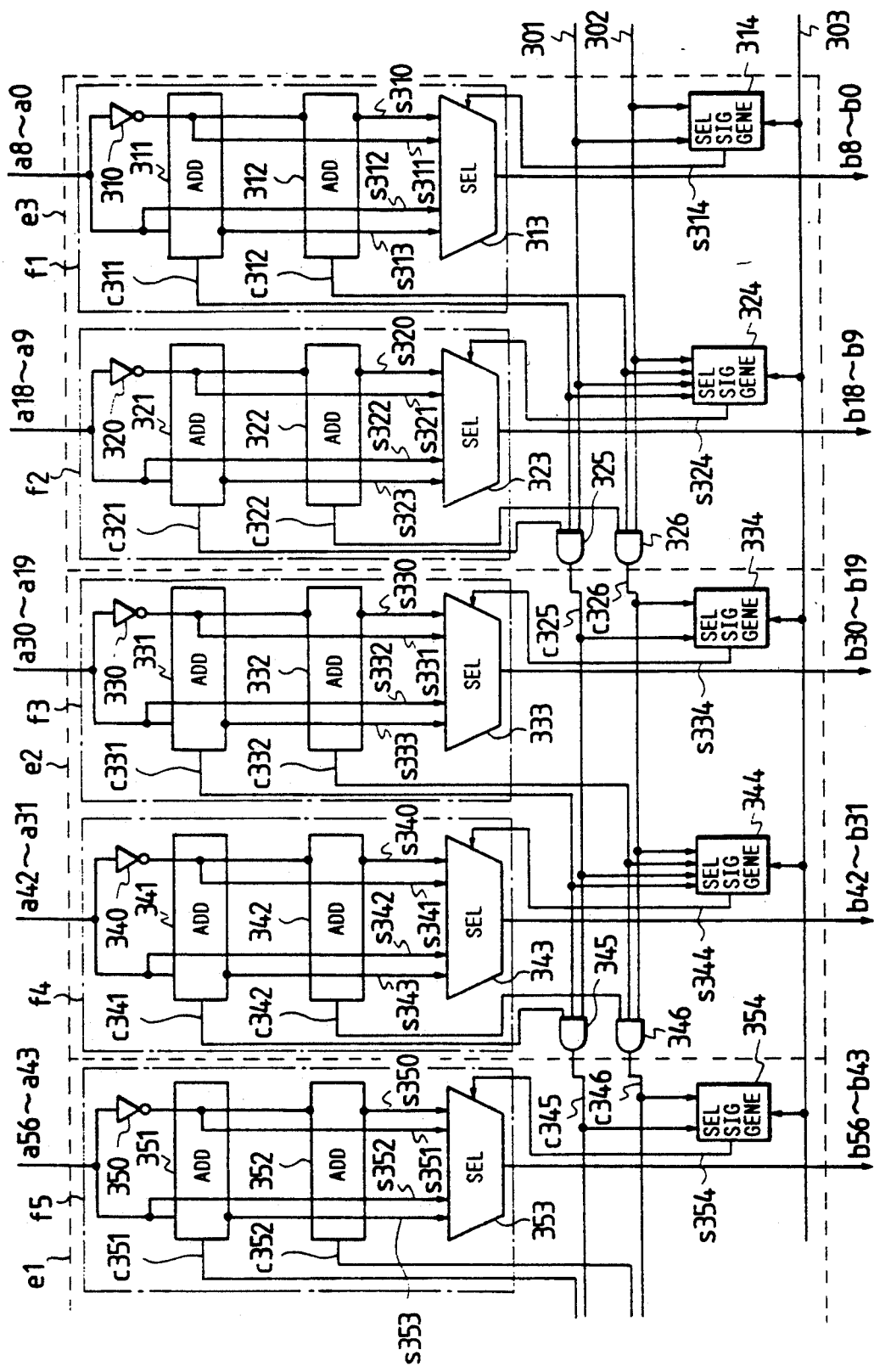
FIG. 7 is a block diagram of an adding/subtracting device according to a third embodiment of this invention.

FIG. 7 shows an adding/subtracting device according to a third embodiment of this invention which includes inverters 310, 320, 330, 340, and 350, first adders 311, 321, 331, 341, and 351, second adders 312, 322, 332, 342, and 352, data selectors 313, 323, 333, 343, and 353, first selection signal generating circuits 314, 334, and 354, second selection signal generating circuits 324 and 344, positive group carry generating circuits 325 and 345, and negative group carry generating circuits 326 and 346.

The inverter 310, the adders 311 and 312, and the data selector 313 are connected to compose a partitioned adder f1. In the partitioned adder f1, partitioned input data a0–a8 are fed to the adder 311. The adder 311 adds "1" to the partitioned input data a0–a8, generating a solution output s313 and a positive carry output c311. The inverter 310 inverts the partitioned input data a0-a8 into an output s311. The output s311 from the inverter 310 is fed to the adder 312. The adder 312 adds "1" to the inverter output s311, generating a solution output s310 and a negative carry output c312. The partitioned input data a0-a8 form data s312. The data selector 313 receives the data s310, s311, s312, and s313, and selects one of the data s310, s311, s312, and s313 in response to a fed selection signal. The data selector 313 generates partitioned output data b0-b8.

The inverter 320, the adders 321 and 322, and the data selector 323 are connected to compose a partitioned adder f2. The partitioned adder f2 processes partitioned input data a9-a18 and generates partitioned output data b9-b18. The internal design of the partitioned adder f2 is similar to the internal design of the partitioned adder f1.

The inverter 330, the adders 331 and 332, and the data selector 333 are connected to compose a partitioned adder f3. The partitioned adder f3 processes partitioned input data a19-a30 and generates partitioned output data b19-b30. The internal design of the partitioned adder f3 is similar to the internal design of the partitioned adder f1.

The inverter 340, the adders 341 and 342, and the data selector 343 are connected to compose a partitioned adder f4. The partitioned adder f4 processes partitioned input data a31-a42 and generates partitioned output data b31-b42. The internal design of the partitioned adder f4 is similar to the internal design of the partitioned adder f1.

The inverter 350, the adders 351 and 352, and the data selector 353 are connected to compose a partitioned adder f5. The partitioned adder f5 processes partitioned input data a43-a56 and generates partitioned output data b43-b56. The internal design of the partitioned adder f5 is similar to the internal design of the partitioned adder f1.

The partitioned adders f1 and f2, the selection signal generating circuits 314 and 324, the positive carry generating circuit 325, and the negative carry generating circuit 326 are connected to compose a group adder e1. In the group adder e1, the selection signal generating circuit 314 receives a positive carry input 301, a negative carry input 302, and a sign signal 303, and generates a selection signal s314 on the basis of the signals 301-303. The selection signal s314 is fed to the data selector 313 so that the selection signal s314 controls the data selection executed by the data selector 313. The selection signal generating circuit 324 receives the signals 301-303, and the positive carry output c311 and the negative carry output c312 from the partitioned adder f1, and generates a selection signal s324 on the basis of the signals 301-303 and c311 and c312. The selection signal s324 is fed to the data selector 323 so that the selection signal s324 controls the data selection executed by the data selector 323. The positive group carry generating circuit 325 includes an AND gate which generates an output c325 on the basis of the positive carry input 301, the positive carry output c311 from the partitioned adder f1, and the positive carry output c321 from the partitioned adder f2. The output c325 from the positive group carry generating circuit 325 is used as a positive group carry output from the group adder e1. The positive group carry output c325 from the group adder e1 is fed to the group adder e2 as a positive carry input. The negative carry generating circuit 326 includes an AND gate which generates an output c326 on the basis of the negative carry input 302, the negative carry output c312 from the partitioned adder f1, and the negative carry output c322 from the partitioned adder f2. The output c326 from the negative group carry generating circuit 326 is used as a negative group carry output from the group adder e1. The negative group carry output c326 from the group adder e1 is fed to the group adder e2 as a negative carry input. The partitioned adders in a common group have equal bit lengths. The bit length of the partitioned adders f3 and f4 in the group adder e2 is greater than the bit length of the partitioned adders f1 and f2 of the group adder e1 by a bit length corresponding to the gate stage number of the positive group carry generating circuit 325 or the negative group carry generating circuit 326.

The partitioned adders f3 and f4, the selection signal generating circuits 334 and 344, the positive carry generating circuit 335, and the negative carry generating circuit 346 are connected to compose a group adder e2. The internal design of the group adder e2 is similar to the internal design of the group adder e1. A group adder e3 includes the partitioned adder f5 and the selection signal generating circuit 354. The internal design of the group adder e3 is similar to the half of the group adder e1.

Figure 8:
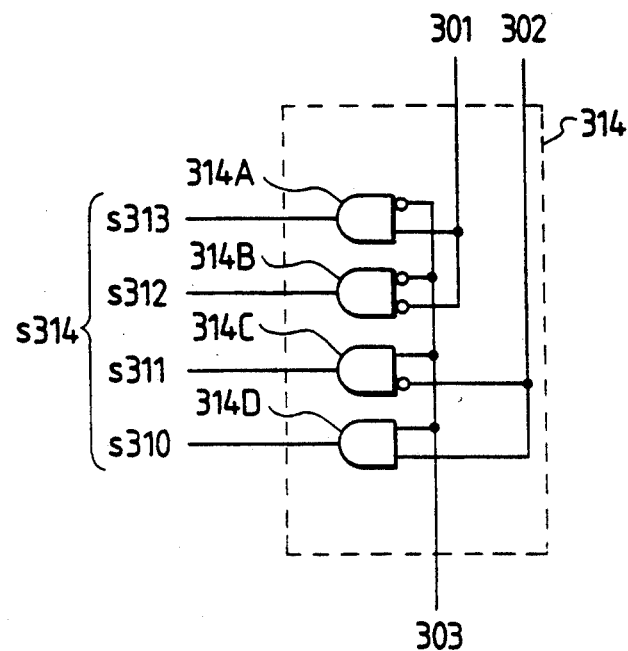
FIG. 8 is a block diagram of a first-type selection signal generating circuit in the adding/subtracting device of FIG. 7.

The selection signal generating circuits 314, 334, and 354 have similar internal designs so that only the selection signal generating circuit 314 will be described in detail. As shown in FIG. 8, the selection signal generating circuit 314 includes gates (logic operation elements) 314A, 314B, 314C, and 314D. First input terminals of the gates 314A-314D receive the sign signal 303. Second input terminals of the gates 314A and 314B receive the positive carry input 301. Second input terminals of the gates 314C and 314D receive the negative carry input 302. The gate 314A generates a signal s313 on the basis of the positive carry input 301 and the sign signal 303. The gate 314B generates a signal s312 on the basis of the positive carry input 301 and the sign signal 303. The gate 314C generates a signal s311 on the basis of the negative carry input 302 and the sign signal 303. The gate 314D generates a signal s310 on the basis of the negative carry input 302 and the sign signal 303. The output signals s313-s310 from the gates 314A-314D compose the selection signal s314.

Figure 9:
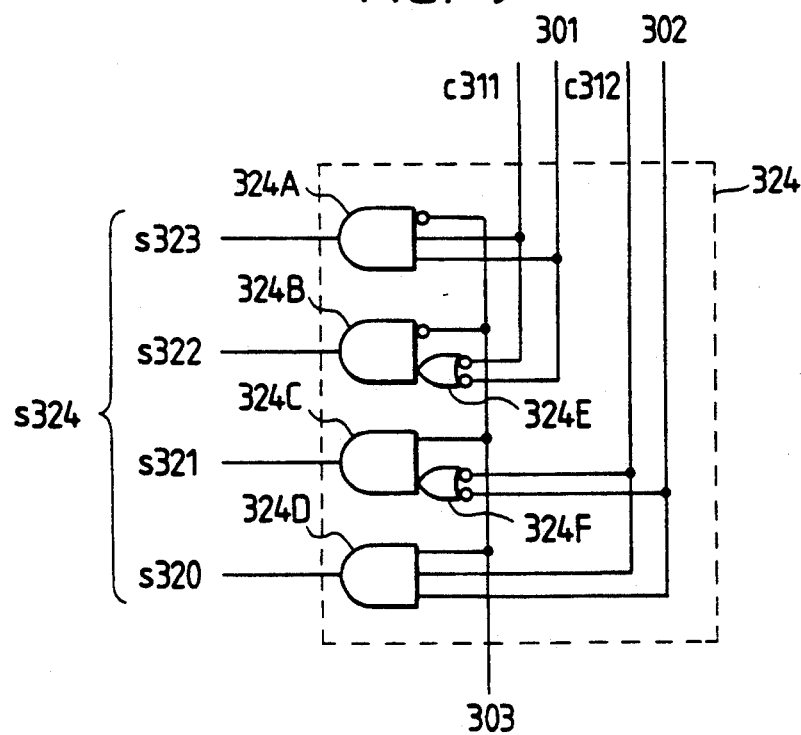
FIG. 9 is a block diagram of a second-type selection signal generating circuit in the adding/subtracting device of FIG. 7.

The selection signal generating circuits 324 and 344 have similar internal designs so that only the selection signal generating circuit 324 will be described in detail. As shown in FIG. 9, the selection signal generating circuit 314 includes gates (logic operation elements) 324A, 324B, 324C, 324D, 324E and 324F. First input terminals of the gates 314A-314D receive the sign signal 303. A second input terminal of the gate 324A receives the positive carry output c311 from the partitioned adder f1. A third input terminal of the gate 324A receives the positive carry input 301. The gate 324A generates a signal s323 on the basis of the signals 303, c311, and 301. Input terminals of the gate 324E receive the positive carry output c311 from the partitioned adder f1 and the positive carry input 301. The output signal from the gate 324E is fed to a second input terminal of the gate 324B. The gate 324B generates a signal s322 on the basis of the sign signal 303 and the output signal from the gate 324E. Input terminals of the gate 324F receive the negative carry output c312 from the partitioned adder f1 and the negative carry input 302. The output signal from the gate 324F is fed to a second input terminal of the gate 324C. The gate 324C generates a signal s321 on the basis of the sign signal 303 and the output signal from the gate 324F. A second input terminal of the gate 324D receives the negative carry output c312 from the partitioned adder f1. A third input terminal of the gate 324D receives the negative carry input 302. The gate 324D generates a signal s320 on the basis of the signals 303, c312, and 302. The output signals s323-s320 from the gates 324A-324D compose the selection signal s324.

The calculation time spent by the adding/subtracting device of FIG. 7 will be expressed in the number of stages of gates where an AND circuit is regarded as two gates. The first period which ends at the generation of the carry output from the adder 311 corresponds to a gate stage number of 8. During the first period, the carry outputs from the partitioned adder f2 are generated. The second period which ends at the generation of the group carry outputs c325 and c326 corresponds to a gate stage number of 2 formed by the positive carry generating circuit 325 and the negative carry generating circuit 326. Until the end of the second period, the carry outputs from the partitioned adders f3 and f4 are generated. The third period which ends at the generation of the selection signal s354 corresponds to a gate stage number of 4 formed by the positive carry generating circuit 345, the negative carry generating circuit 346, and the selection signal generating circuit 354. Therefore, the total calculation time of the adding/subtracting device is expressed as corresponding to a gate stage number of 14. A prior art adding/subtracting device having the same bit number as the adding/subtracting device of FIG. 7 corresponds to a gate stage number of 26. Accordingly, the calculation time of the adding/subtracting device of FIG. 7 can be shorter than the calculation time of the prior art adding/subtracting device.

In the adding/subtracting device of FIG. 7, the adders 311, 321, 331, 341, and 351 add "1" to the partitioned input data and simultaneously the adders 312, 322, 332, 342, and 352 change the partitioned input data between positive and negative, and the selections of the adder outputs are executed by the data selection parts of the carry selection adders. Thus, the adding/subtracting device of FIG. 7 is substantially free from a calculation loss and a high-speed calculation is enabled.

Since there are many similar sections in the adding/subtracting device of FIG. 7, the layout of the adding/subtracting device can be easy.

DESCRIPTION OF THE FOURTH PREFERRED EMBODIMENT

Figure 10:
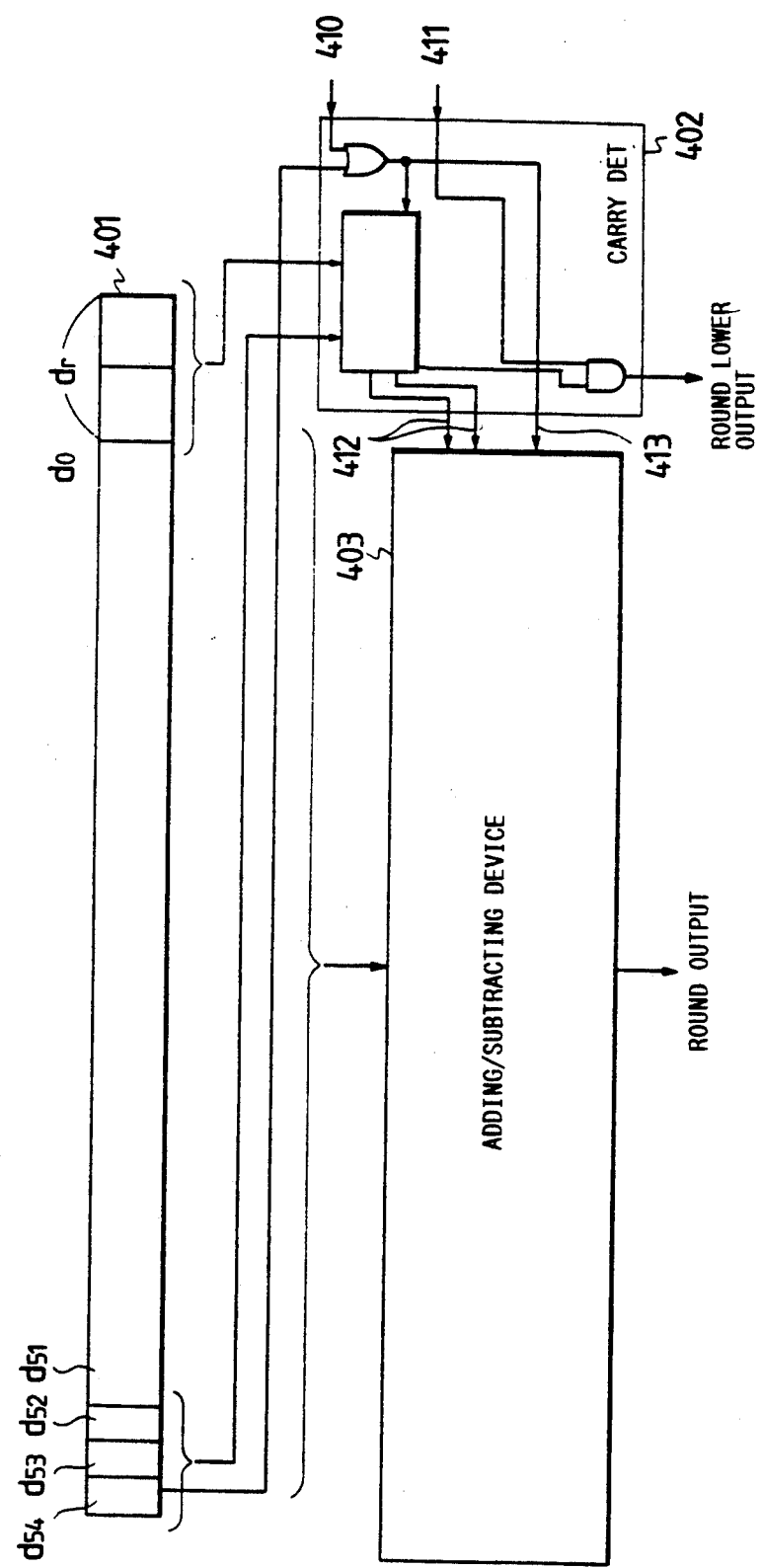
FIG. 10 is a block diagram of a rounding circuit according to a fourth embodiment of this invention.

FIG. 10 shows a rounding circuit according to a fourth embodiment of this invention. In FIG. 10, input data 401 include a sign bit d54, carry bits d53 and d52, and round data bits dr. The rounding circuit includes a carry detecting circuit (a round place detecting circuit) 402 and an adding/subtracting device 403. The adding/subtracting device 403 can be the adding/subtracting device of FIG. 7.

The sign bit d54, the carry bits d53 and d52, and the round data bits dr of the input data 401 are fed to the carry detecting circuit 402. Carry outputs 412 from the carry detecting circuit 402 are fed to the adding/subtracting device 403 as a first-stage positive group carry input and a second-state negative group carry input. The carry detecting circuit 402 outputs a sign signal 413 to the adding/subtracting device 403. The carry detecting circuit 402 receives control signals 410 and 411. The bit lengths of the first-stage partitioned adder and the second-stage partitioned adder within the adding/subtracting device 403 are chosen so that the output propagation gate stage number of the carry detecting circuit 402 will be equal to the gate delay stage numbers of the carry outputs from the first-stage partitioned adder and the second-stage partitioned adder within the adding/subtracting device 403. The output signal from the adding/subtracting device 403 is used as a round output.

Figure 11:
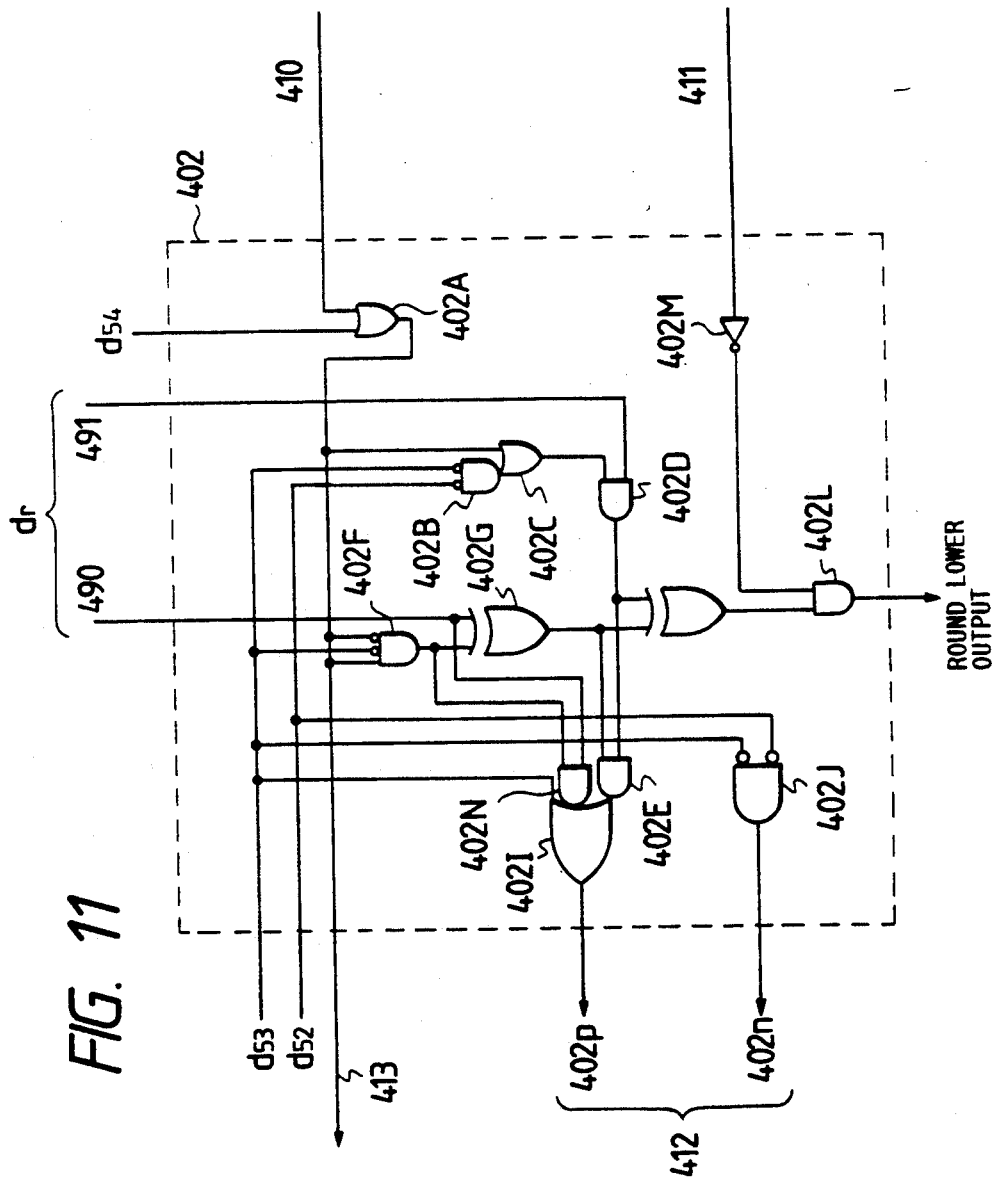
FIG. 11 is a block diagram of the carry detecting circuit of FIG. 10.

As shown in FIG. 11, the carry detecting circuit 402 includes gates (logic operation elements) 402A-202L and an inverter 402M. A first input terminal of the gate 402A receives the sign bit d54 of the input data. A second input terminal of the gate 402A receives the control signal 410. The gate 402A generates the sign signal 413 on the basis of the sign bit d54 of the input data and the control signal 410. Input terminals of the gate 402B receive the carry bits d53 and d52 of the input data respectively. The output signal from the gate 402B is fed to a first input terminal of the gate 402C. A second input terminal of the gate 402C receives the sign signal 413. The output signal from the gate 402C is fed to a first input terminal of the gate 402D. A second input terminal of the gate 402D receives a round data bit 491 of the input data. The output signal from the gate 402D is fed to a first input terminal of the gate 402E. A first input terminal of the gate 402F receives the sign signal 413. A second input terminal of the gate 402F receives the carry bit d53 of the input data. A third input terminal of the gate 402F also receives the sign signal 413. The output signal from the gate 402F is fed to a first input terminal of the gate 402G. A second input terminal of the gate 402G receives a round data bit 490 of the input data. The output signal from the gate 402G is fed to a second input terminal of the gate 402E. A first input terminal of the gate 402H receives the output signal from the gate 402F. A second input terminal of the gate 402H receives the round data bit 490 of the input data. A first input terminal of the gate 402I receives the carry bit d53 of the input data. A second input terminal of the gate 402I receives the output signal from the gate 402H. A third input terminal of the gate 402I receives the output signal from the gate 402E. The gate 402I generates a positive carry output 402p on the basis of the carry bit d53 of the input data, and the output signals from the gates 402E and 402H. Input terminals of the gate 402J receive the carry bits d53 and d52 of the input data. The gate 402J generates a negative carry output 402n on the basis of the carry bits d53 and d52 of the input data. The positive carry output 402p and the negative carry output 402n form the carry outputs 412 from the carry detecting circuit 402. The output signal from the gate 402G is fed to a first input terminal of the gate 402K. The output signal from the gate 402D is fed to a second input terminal of the gate 402K. The output signal from the gate 402K is fed to a first input terminal of the gate 402L. The control signal is fed to the input terminal of the inverter 402M. The output signal from the inverter 402M is fed to a second input terminal of the gate 402L. The gate 402L generates a lower-place round output on the basis of the output signals from the gate 402K and the inverter 402M. The round data bits 490 and 491 form the round data bits dr.

The internal design of the carry detection circuit 402 is suited to the following round mode. With respect to the addition and the subtraction between data having 52-bit mantissa parts: "1" is added to the LSB of the significant bits in the case where the calculation result output is "01*. * •••"; "1" is added to the guard bit which is lower in place than the LSB by one bit in the case where the calculation result output is "001. *•••"; "1" is added to the round bit which is lower in place than the LSB by two bits in the case where the calculation result output is "000. *•••"; and "1" is added to the round bit in the case where the calculation result output represents a negative number such as "1.•••".

The carry detection circuit 402 may be modified as follows. In a first modification, the round data bits dr are composed of the LSB, the guard bit, and the round bit. In a second modification, the sticky bit which is lower in place than the LSB by three bits is used in the round data bits dr.

A part of the calculation of the adding/subtracting device 403 is executed during the time of the detection of the rounding place and therefore the total calculation time of the rounding circuit of FIG. 10 can be short, while the total rounding calculation time is equal to the sum of the time of the detection of the rounding place and the calculation time of the adding/subtracting device in the prior art rounding circuit of FIG. 2.

DESCRIPTION OF THE FIFTH PREFERRED EMBODIMENT

Figure 12:
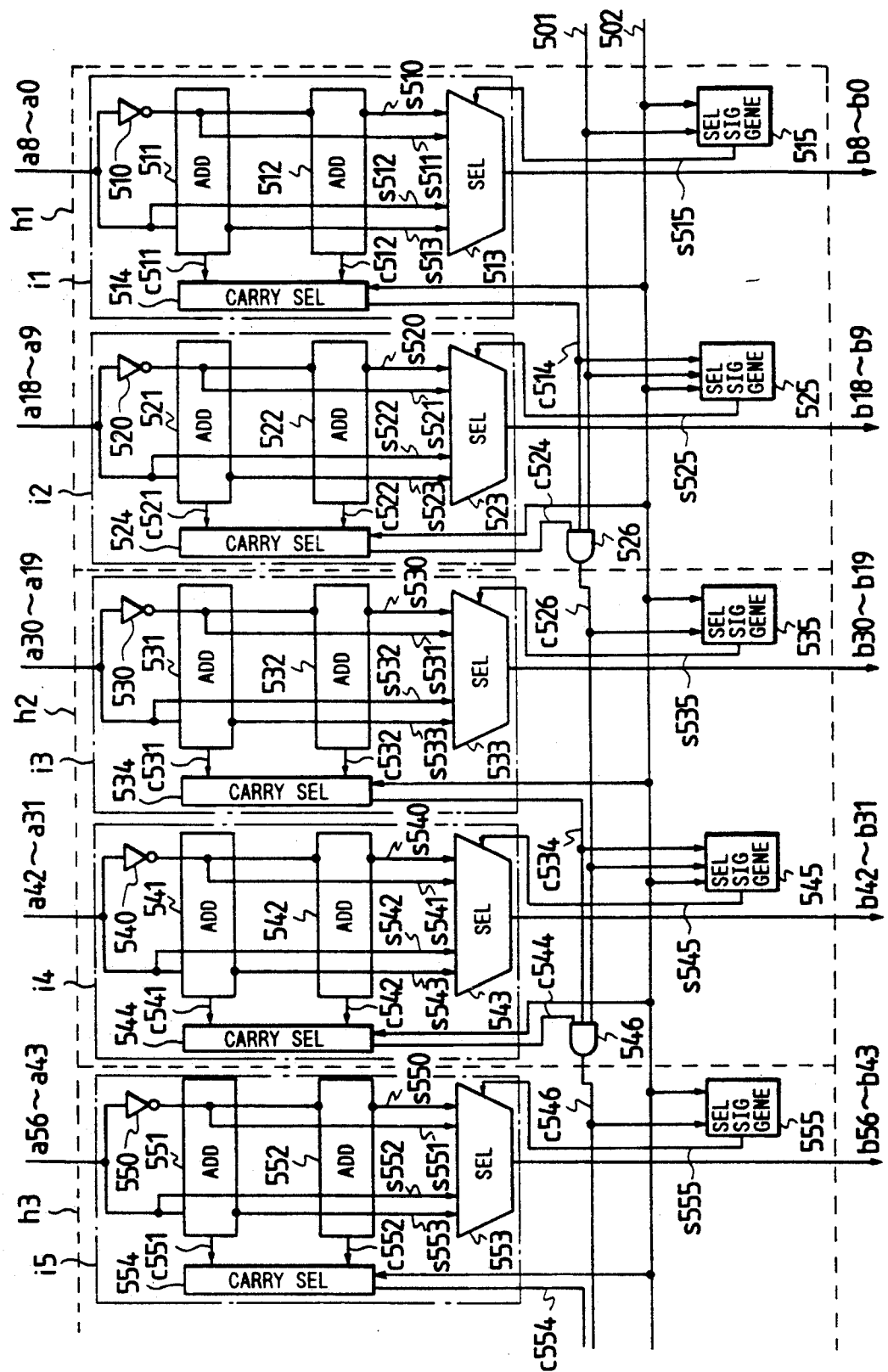
FIG. 12 is a block diagram of an adding/subtracting device according to a fifth embodiment of this invention.

FIG. 12 shows an adding/subtracting device according to a fifth embodiment of this invention which includes inverters 510, 520, 530, 540, and 550, first adders 511, 521, 531, 541, and 551, second adders 512, 522, 532, 542, and 552, data selectors 513, 523, 533, 543, and 553, carry selectors 514, 524, 534, 544,and 554, first selection signal generating circuits 515, 535, and 555, second selection signal generating circuits 525 and 545, and group carry generating circuits 526 and 546.

The inverter 510, the adders 511 and 512, the data selector 513, and the carry selector 514 are connected to compose a partitioned adder i1. In the partitioned adder i1, partitioned input data a0-a8 are fed to the adder 511. The adder 511 adds "1" to the partitioned input data a0-a8, generating a solution output s513 and a positive carry output c511. The inverter 510 inverts the partitioned input data a0-a8 into an output s511. The output s511 from the inverter 510 is fed to the adder 512. The adder 512 adds "1" to the inverter output s511, generating a solution output s510 and a negative carry output c512. The partitioned input data a0-a8 form data s512. The data selector 513 receives the data s510, s511, s512, and s513, and selects one of the data s510, s511, s512, and s513 in response to a fed selection signal. The data selector 513 generates partitioned output data b0-b8. The carry outputs c511 and c512 from the adders 511 and 512 are fed to the carry selector 514. The carry selector 514 selects one of the carry signals c511 and c512 in response to a sign signal 502, and generates a carry output c514 representing the selected carry signal.

The inverter 520, the adders 521 and 522, the data selector 523, and the carry selector 524 are connected to compose a partitioned adder i2. The partitioned adder 12 processes partitioned input data a9-a18 and generate partitioned output data b9-b18. The internal design of the partitioned adder i2 is similar to the internal design of the partitioned adder i1.

The inverter 530, the adders 531 and 332, the data selector 533, and the carry selector 534 are connected to compose a partitioned adder i3. The partitioned adder i3 processes partitioned input data a19-a30 and generates partitioned output data b19-b30. The internal design of the partitioned adder i3 is similar to the internal design of the partitioned adder i1.

The inverter 540, the adders 541 and 542, the data selector 543, and the carry selector 544 are connected to compose a partitioned adder i4. The partitioned adder i4 processes partitioned input data a31-a42 and generates partitioned output data b31-b42. The internal design of the partitioned adder i4 is similar to the internal design of the partitioned adder i1.

The inverter 550, the adders 551 and 552, the data selector 553, and the carry selector 554 are connected to compose a partitioned adder i5. The partitioned adder i5 processes partitioned input data a43-a56 and generates partitioned output data b43-b56. The internal design of the partitioned adder i5 is similar to the internal design of the partitioned adder i1.

The partitioned adders i1 and i2, the selection signal generating circuits 515 and 525, and the group carry generating circuit 526 are connected to compose a group adder h1. In the group adder h1, the selection signal generating circuit 515 receives a carry input 501 and the sign signal 502, and generates a selection signal s515 on the basis of the signals 501 and 502. The selection signal s515 is fed to the data selector 513 so that the selection signal s515 controls the data selection executed by the data selector 513. The selection signal generating circuit 525 receives the carry input 501, the sign signal 502, and the carry output c514 from the carry selector 514, and generates a selection signal s525 on the basis of the signals 501, 502, and c514. The selection signal s525 is fed to the data selector 523 so that the selection signal s525 controls the data selection executed by the data selector 523. The group carry generating circuit 526 includes an AND gate which generates an output c526 on the basis of the carry input 501, the carry output c514 from the partitioned adder i1, and the carry output c524 from the partitioned adder i2. The output c526 from the group carry generating circuit 526 is used as a group carry output from the group adder h1. The group carry output c526 from the group adder h1 is fed to the group adder h2 as a carry input. The partitioned adders in a common group have equal bit lengths. The bit length of the partitioned adders i3 and i4 in the group adder h2 is greater than the bit length of the partitioned adders i1 and i2 of the group adder h1 by a bit length corresponding to the gate stage number of the group carry generating circuit 526.

The partitioned adders i3 and i4, the selection signal generating circuits 535 and 545, and the group carry generating circuit 546 are connected to compose a group adder h2. The internal design of the group adder h2 is similar to the internal design of the group adder h1. A group adder h3 includes the partitioned adder i5 and the selection signal generating circuit 555. The internal design of the group adder h3 is similar to the half of the group adder h1.

Figure 13:
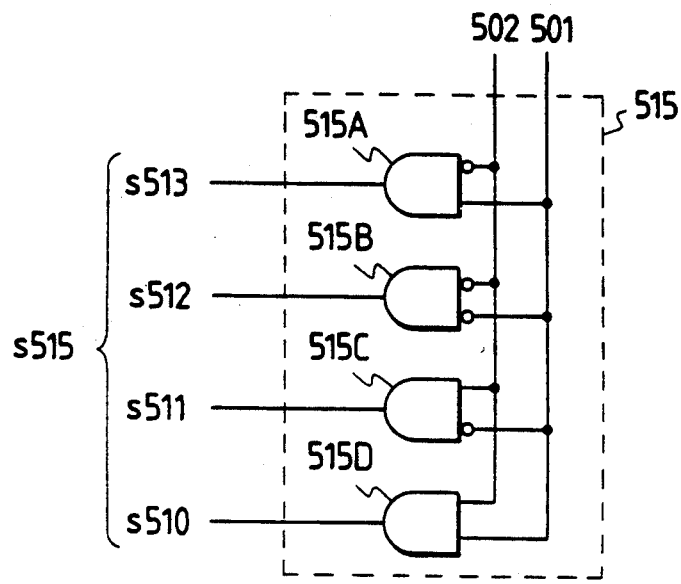
FIG. 13 is a block diagram of a first-type selection signal generating circuit in the adding/subtracting device of FIG. 12.

The selection signal generating circuits 515, 525, and 555 have similar internal designs so that only the selection signal generating circuit 515 will be described in detail. As shown in FIG. 13, the selection signal generating circuit 515 includes gates (logic operation elements) 515A, 515B, 515C, and 515D. First input terminals of the gates 515A-515D receive the carry input 501. Second input terminals of the gates 515A-515D receive the sign signal 502. The gate 515A generates a signal s513 on the basis of the signals 501 and 502. The gate 515B generates a signal s512 on the basis of the signals 501 and 502. The gate 515C generates a signal s511 on the basis of the signals 501 and 502. The gate 515D generates a signal s510 on the basis of the signals 501 and 502. The output signals s513-s510 from the gates 515A-515D compose the selection signal s515.

Figure 14:
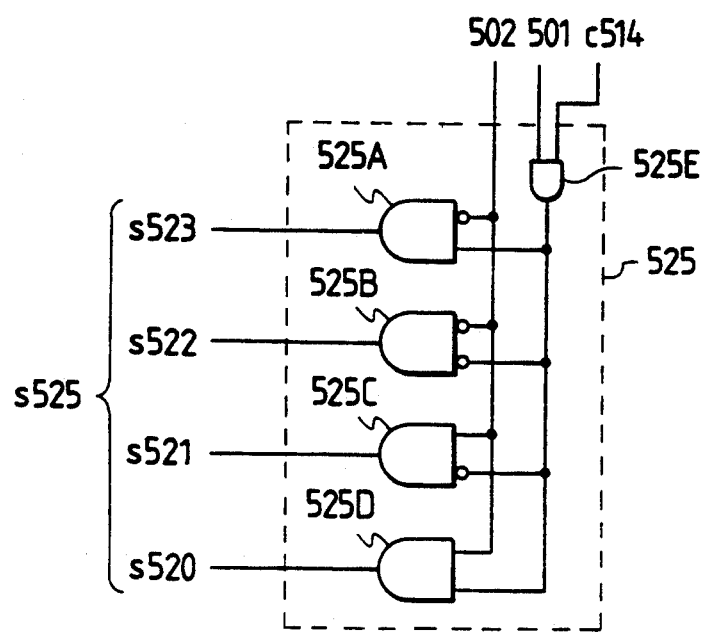
FIG. 14 is a block diagram of a second-type selection signal generating circuit in the adding/subtracting device of FIG. 12.

The selection signal generating circuits 525 and 545 have similar internal designs so that only the selection signal generating circuit 525 will be described in detail. As shown in FIG. 14, the selection signal generating circuit 525 includes gates (logic operation elements) 525A, 525B, 525C, 525D, and 525E. A first input terminal of the gate 525E receives the carry input 501. A second input terminal of the gate 525E receives the carry output c514 from the partitioned adder i1. First input terminals of the gates 525A-525D receive the sign signal 502. Second input terminals of the gates 525A-525D receive the output signal from the gate 525E. The gate 525A generates a signal s523 on the basis of the sign signal 502 and the output signal from the gate 525E. The gate 525B generates a signal s522 on the basis of the sign signal 502 and the output signal from the gate 525E. The gate 525C generates a signal s521 on the basis of the sign signal 502 and the output signal from the gate 525E. The gate 525D generates a signal s520 on the basis of the sign signal 502 and the output signal from the gate 525E. The output signals s523-s520 from the gates 525A-525D compose the selection signal s525.

The adding/subtracting device of FIG. 12 has advantages similar to the advantages of the adding/subtracting circuit of FIG. 7.

Figure 15:
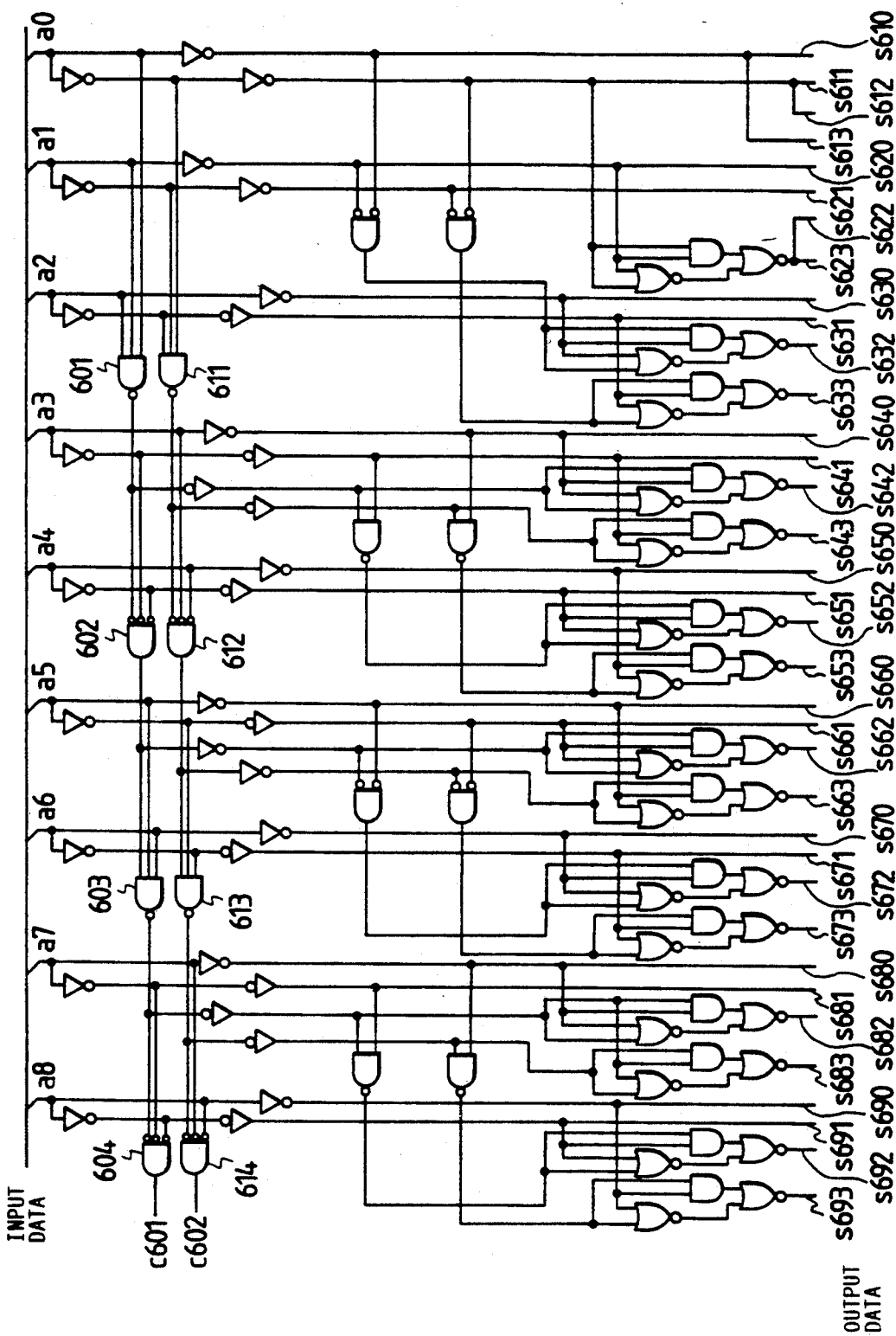
FIG. 15 is a block diagram of a part of a partitioned adder in the adding/subtracting device of FIG. 12.

As shown in FIG. 15, the partitioned adder i1 includes 3-input NAND circuits 601, 611, 603, and 613, and 3-input NOR circuits 602, 612, 604, and 614. The partitioned adder i1 generates output data s610-s613, s620-s623, s630-s633, s640-s643, s650-s653, s660-s663, s670-s673, s680-s683, and s690-s693 on the basis of the input data a0-a8. The input data a0, a1, and a3 are fed to the NAND circuit 601. The output signal from the NAND circuit 601 and the inversions of the input data a3 and a4 are fed to the NOR circuit 602. The output signal from the NOR circuit 602 and the input data a5 and a6 are fed to the NAND circuit 603. The output signal from the NAND circuit 603 and the inversions of the input data a7 and a8 are fed to the NOR circuit 604. The output signal from the NOR circuit 604 constitutes a positive carry output c601. Similarly, a negative carry output c602 is generated. The carry propagation part is realized by the positive-negative inverting logic circuits, and thereby the output gate stage number can be reduced to about the half with respect to a prior art design.

It should be noted that the structure of FIG. 15 can be used in the partitioned adders in the adding/subtracting device of FIG. 7.

DESCRIPTION OF THE SIXTH PREFERRED EMBODIMENT

A sixth embodiment of this invention is similar to the embodiment of FIGS. 10 and 11 except that an adding-/subtracting device 403 is composed of the adding/subtracting device of FIG. 12. The sixth embodiment has advantages similar to the advantages of the embodiment of FIGS. 10 and 11.

DESCRIPTION OF THE SEVENTH PREFERRED EMBODIMENT

Figure 16:
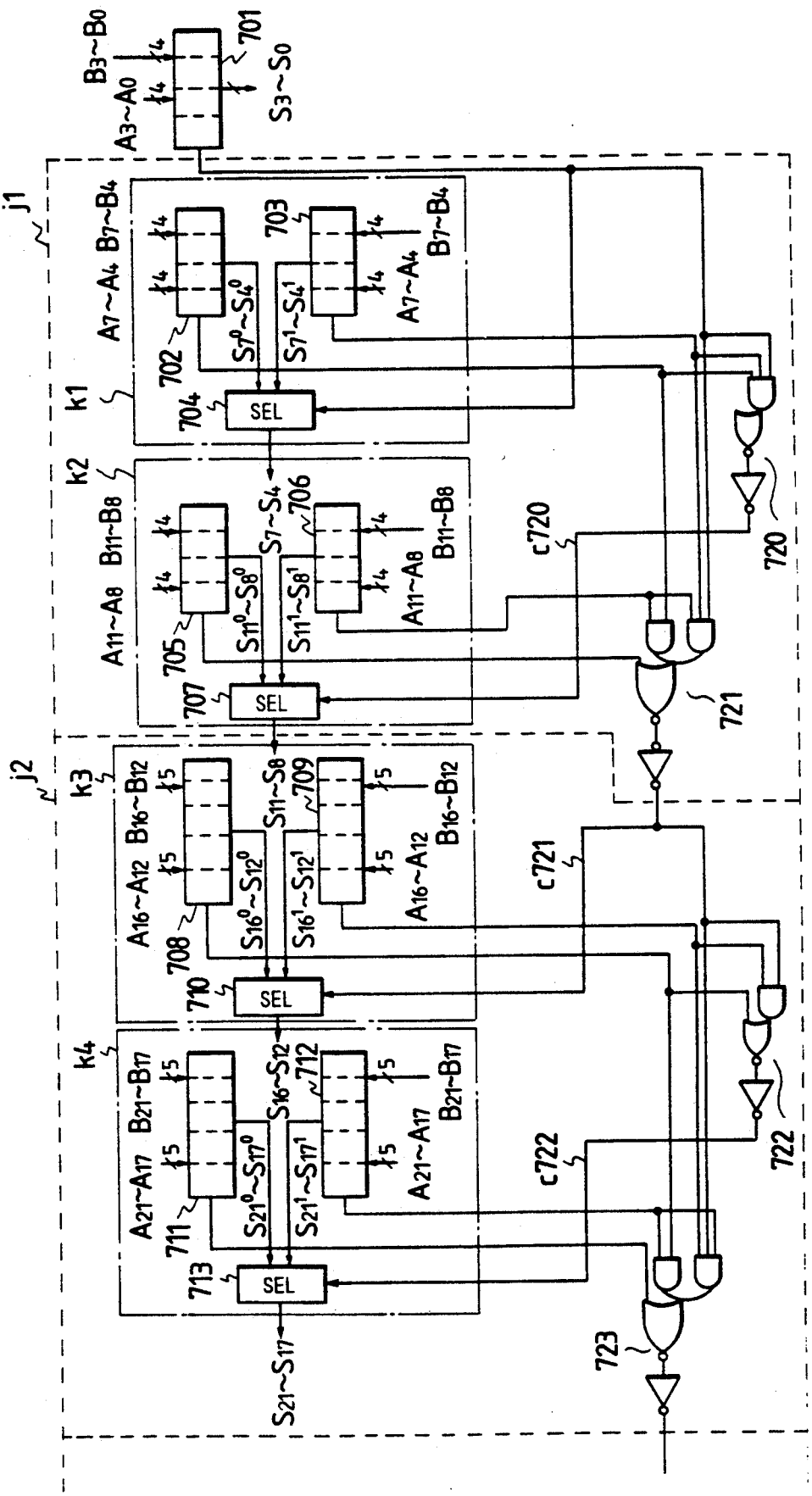
FIG. 16 is a block diagram of a 2-input adding device according to a seventh embodiment of this invention.

FIG. 16 shows a 2-input adding device according to a seventh embodiment of this invention. In FIG. 16, input augend data A0-A21 are separated into partitioned input augend data A0-A3, A4-A7, A8-A11, A12-A16, and A17-A21. Similarly, input addend data B0-B21 are separated into partitioned input addend data. The adding device includes first adders 701, 702, 705, 708, and 711, and second adders 703, 706, 709, and 712. The first adders 701, 702, 705, 708, and 711 add the partitioned input addend data and the partitioned input augend data with a carry input being "0". The second adders 703, 706, 709, and 712 add the partitioned input addend data and the partitioned input augend data with a carry input being "1". The adding device also includes data selectors 704, 707, 710, and 713, selection signal generating circuits 720 and 722, and group carry generating circuits 721 and 723.

The adders 702 and 703 and the data selector 704 are connected to compose a partitioned adder k1. Similarly, partitioned adders k2, k3, and k4 are composed.

In the partitioned adder k1, the partitioned input augend data A7-A4 are fed to the adders 702 and 703, and the addition outputs from the two adders are fed to the data selector 704 which generates partitioned addition result data S7-S4. The internal parts of the partitioned adders k2, k3, and k4 are connected in a manner similar to the manner of the connection of the internal parts of the partitioned adder k1.

The partitioned adders k1 and k2, the selection signal generating circuit 720, and the group carry generating circuit 721 are connected to compose a group adder j1. Similarly, a group adder j2 is composed. With respect to the group adder j1, the carry output from the adder 701 is used as a carry input of the preceding group. In the group adder j1, the carry input is used as a selection signal fed to the data selector 704. In addition, the carry input from the preceding group, the carry output from the adder 702, and the carry output from the adder 703 are fed to the selection signal generating circuit 720. The output signal from the selection signal generating circuit 720 is used in controlling the data selection executed by the data selector 707. The carry input from the preceding group, the carry output from the adder 702, the carry output from the adder 703, the carry output from the adder 705, and the carry output from the adder 706 are fed to the group carry generating circuit 721. The output signal c721 from the group carry generating circuit 721 is used as a carry output from the group adder j1. The internal parts of the group adder j2 are connected in a manner similar to the manner of the connection of the internal parts of the group adder j1. The partitioned adders in a common group have equal bit lengths. The bit length of the partitioned adders in the group adder j2 is greater than the bit length of the partitioned adders in the group adder j1 by a bit length corresponding to the gate stage number of the group carry generating circuit 721.

The adding device of FIG. 16 has advantages similar to the advantages of the incrementer of FIG. 3.

DESCRIPTION OF THE EIGHTH PREFERRED EMBODIMENT

Figure 17:
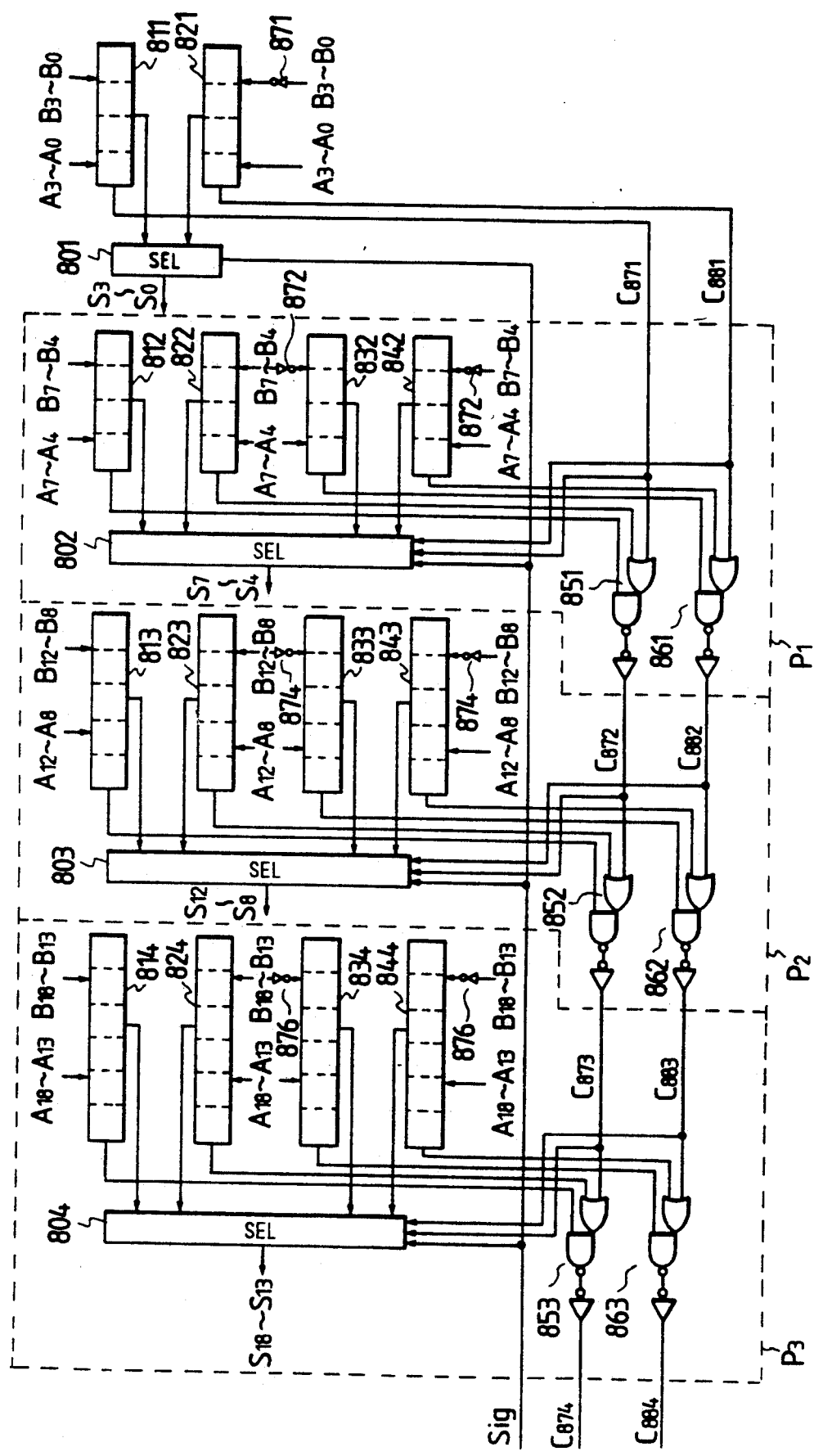
FIG. 17 is a block diagram of a 2-input adding/subtracting device according to an eighth embodiment of this invention.

FIG. 17 shows a 2-input adding/subtracting device. In FIG. 17, input addend data A0-A18 are separated into partitioned input addend data A0-A3, A4-A7, A8-A12, and A13-A18. Similarly, input augend data B0-B18 are separated into partitioned input augend data. The adding/subtracting device includes inverters 871, 872, 874, and 876, first adders 812, 813, and 814, second adders 822, 823, and 824, third adders 832, 833, and 834, fourth adders 842, 843, and 844. The inverters 871, 872, 874, and 876 invert the partitioned input augend data B3-B0, B7-B4, B12-B8, and B18-B13. The first adders 812, 813, and 814 add the partitioned input addend data and the partitioned input augend data with a carry being "0". The second adders 822, 823, and 824 add the partitioned input addend data and the partitioned input augend data with a carry being "1". The third adders 832, 833, and 834 add the partitioned input addend data and the inversions of the partitioned input augend data with a carry being "0". The fourth adders 842, 843, and 844 add the partitioned input addend data and the inversions of the partitioned input augend data with a carry being "1". The adding/subtracting device also includes adders 811 and 821, data selectors 802, 803, and 804, and carry generating circuits 851, 852, 853, 861, 862, and 863. The adder 811 adds the partitioned input addend data and the partitioned input augend data with a carry being "0". The adder 821 adds the partitioned input addend data and the inversion of the partitioned input augend data with a carry being "1". The data selectors 802, 803, and 804 select ones of the addition result outputs from the first, second, third, and fourth adders.

The first adder 812, the second adder 822, the third adder 832, the fourth adder 842, the data selector 874, and the carry generating circuits 851 and 861 are connected to compose a partitioned adder p1. Similarly, partitioned adders p2 and p3 are composed.

In the partitioned adder p1, the carry generating circuit 851 generates a first carry output c872 on the basis of a first carry input c871 from a preceding stage and carry outputs from the first and second adders 812 and 822. In addition, the carry generating circuit 861 generates a second carry output c882 on the basis of a second carry input c881 from the preceding stage and carry outputs from the third and fourth adders 832 and 842. The data selector 802 executes the data selection in response to the first carry input c871, the second carry input c881, and a sign signal "Sig". The internal parts of the partitioned adders p2 and p3 are connected in a manner similar to the manner of the connection of the internal parts of the partitioned adder p1.

As described previously, the input addend data "A" and the input augend data "B" are separated into the partitioned input addend data and the partitioned input augend data. In each of the partitioned adders: the first adder executes the calculation "A+B"; the second adder executes the calculation "A+B+1"; the third adder executes the calculation "A+B̄"; and the fourth adder executes the calculation "A+B̄+1". The addition result outputs from the first, second, third, and fourth adders are fed to the data selector. When the sign signal "Sig" denotes addition, the data selector selects one of the addition result outputs from the first and second adders in response to the first carry input. When the sign signal "Sig" denotes subtraction, the data selector selects one of the addition result outputs from the third and fourth adders in response to the second carry input. The output data from the data selectors compose a resolution output.

In the adding/subtracting device of FIG. 17, since the addition and the subtraction are executed simultaneously and the addition result data and the subtraction result data are changed by the data selector in each of the partitioned adders, a high-speed calculation is enabled. Since there are many similar sections in the adding/subtracting device of FIG. 17, the layout of the adding/subtracting device can be easy.

What is claimed is:

1. An arithmetic device for executing an arithmetic operation on input data separated into a plurality of partitioned input data, the device comprising:

a plurality of partitioned adders receiving a plurality of partitioned input data respectively and each including a first adder element adding "1" to partitioned input data, an inverter inverting the partitioned input data, a second adder element adding "1" to output data from the inverter, and a data selector selecting one of the partitioned data, the output from the inverter, output data from the first adder element, and output data from the second adder element in response to a selection signal;

an n-th group defined by a (2n−1)-th partitioned adder and a 2n-th partitioned adder, where "n" denotes natural numbers between 1 and a given number equal to a total number of group;

the n-th group including the (2n−1)-th partitioned adder, the 2n-th partitioned adder, a positive group carry generating circuit, a negative group carry generating circuit, a first selection signal generating circuit, and a second selection signal generating circuit, wherein the positive group carry generating circuit generates a positive group carry output of the n-th group on the basis of a carry output from a first adder element in the (2n−1)-th partitioned adder, a carry output from a first adder element in the 2n-th partitioned adder, and a positive carry output from an (n−1)-th group, wherein the negative group carry generating circuit generates a negative group carry output of the n-th group on the basis of a carry output from a second adder element in the (2n−1)-th partitioned adder, a carry output from a second adder element in the 2n-th partitioned adder, and a negative carry output from the (n−1)-th group, wherein the first selection signal generating circuit generates a selection signal to a data selector in the (2n−1)-th partitioned adder on the basis of the positive carry output from the (n−1)-th group, the negative carry output from the (n−1)-th group, and a sign signal, and wherein the second selection signal generating circuit generates a selection signal to a data selector in the 2n-th partitioned adder on the basis of the positive carry output from the (n−1)-th group, the negative carry output from the (n−1)-th group, the sign signal, the carry output from the first adder element in the (2n−1)-th partitioned adder, and the carry output from the second adder element in the (2n−1)-th partitioned adder;

wherein bit lengths of the first and second adder elements in the (2n−1)-th partitioned adder and the 2n-th partitioned adder are chosen so that propagation gate stage numbers of positive and negative group carry outputs of the (n−1)-th group which are inputted into the positive and negative group carry generating circuits of the n-th group will be equal to propagation gate stage numbers of the carry outputs from the first and second adder elements in the (2n−1)-th partitioned adder and the 2n-th partitioned adder, and wherein partitioned sums outputted from data selectors in the respective groups compose a sum result output.

2. The arithmetic device of claim 1 further comprising a carry detecting circuit receiving a sign bit, carry bits, and round data bits of the input data, wherein a positive carry output and a negative carry output from the carry detecting circuit constitute a positive group carry input and a negative group carry input of a first of the groups, wherein bit lengths of a first partitioned adder and a second partitioned adder are chosen so that propagation gate stage numbers of the positive and negative carry outputs from the carry detecting circuit will be equal to propagation gate stage numbers of carry outputs from the first partitioned adder and the second partitioned adder, and wherein the partitioned sums outputted from data selectors in the respective groups compose a round result output.

3. An arithmetic device for executing an arithmetic operation on input data separated into a plurality of partitioned input data, the device comprising:

a plurality of partitioned adders receiving a plurality of partitioned input data respectively and each including a first adder element adding "1" to partitioned input data, an inverter inverting the partitioned input data, a second adder element adding "1" to output data from the inverter, a data selector selecting one of the partitioned data, the output data from the inverter, output data from the first adder element, and output data from the second adder element in response to a selection signal, and a carry selector selecting one of carry outputs from the first and second adder elements;

an n-th group defined by a (2n−1)-th partitioned adder and a 2n-th partitioned adder, where "n" denotes natural numbers between 1 and a given number equal to a total number of groups;

the n-th group including the (2n−1)-th partitioned adder, the 2n-th partitioned adder, a group carry generating circuit, and a second selection signal generating circuit, wherein the group carry generating circuit generates a group carry output of the n-th group on the basis of carry outputs from carry selectors in the (2n−1)-th partitioned adder and the 2n-th partitioned adder and a group carry output from an (n−1)-th group, wherein the first selection signal generating circuit generates a selection signal to a data selector in the (2n−1)-th partitioned adder on the basis of the group carry output from the (n−1)-th group and a sign signal, and wherein the second selection signal generating circuit generates a selection signal to a data selector in the 2n-th partitioned adder on the basis of the group carry output from the (n−1)-th group, the sign signal, and the carry output from the carry selector in the (2n−1)-th partitioned adder;

wherein bit lengths of the (2n−1)-th partitioned adder and the 2n-th partitioned adder are chosen so that a propagation gate stage number of the group carry output of the (n−1)-th group which is inputted into the group carry generating circuit in the n-th group will be equal to propagation gate stage numbers of the carry outputs from the carry selectors in the (2n−1)-th partitioned adder and the 2n-th partitioned adder, and wherein partitioned sums outputted from data selectors in the respective groups compose a sum result output.

4. The arithmetic device of claim 3 further comprising a carry detecting circuit receiving a sign bit, carry bits, and round data bits of the input data, wherein a carry output from the carry detecting circuit constitutes a group carry input into a first of the groups, wherein bit lengths of a first partitioned adder and a second partitioned adder are chosen so that a propagation gate stage number of the carry output from the carry detecting circuit will be equal to propagation gate stage numbers of carry outputs from carry selectors of the first partitioned adder and the second partitioned adder, and wherein the partitioned sums outputted from data selectors in the respective groups compose a round result output.

5. An arithmetic device for executing an arithmetic operation between input addend data and input augend data separated into a plurality of partitioned input addend data and a plurality of partitioned input augend data, the device comprising:

a plurality of partitioned adders receiving a plurality of partitioned input addend data and a plurality of partitioned input augend data respectively and each including a first adder element adding partitioned input addend data and partitioned input augend data with a carry input being "0", a second adder element adding the partitioned input addend data and the partitioned input augend data with a carry input being "1", an inverter inverting the partitioned input augend data, a third adder element adding the partitioned input addend data and output data from the inverter with a carry input being "0", a fourth adder element adding the partitioned input addend data and output data from the inverter with a carry input being "1", a first partitioned carry generating circuit, a second partitioned carry generating circuit, and a data selector, wherein the first partitioned carry generating circuit generates a first carry output on the basis of a carry output from the first adder element, a carry output from the second adder element, and a first partitioned carry input, wherein the second partitioned carry generating circuit generates a second partitioned carry output on the basis of a carry output from the third adder element, a carry output from the fourth adder element, and a second partitioned carry input, and wherein the data selector selects one of output data from the first adder element, the second adder element, the third adder element, and the fourth adder element in response to the first partitioned carry input, the second partitioned carry input, and a sign signal;

wherein partitioned sums outputted from data selectors in the respective partitioned adders compose a sum result output. h

* * * * *

UNITED STATES PATENT AND TRADEMARK OFFICE
CERTIFICATE OF CORRECTION

PATENT NO. : 5,198,993

DATED : March 30, 1993

INVENTOR(S) : Yasuhiro Nakakura

It is certified that error appears in the above-identified patent and that said Letters Patent is hereby corrected as shown below:

On the title page, under item [19] and item [75], change "Yasuhiro Makakura" to --Yasuhiro Nakakura--.

Signed and Sealed this

Twenty-third Day of November, 1993

*Attest:*

BRUCE LEHMAN

*Attesting Officer*  *Commissioner of Patents and Trademarks*